US009413179B2

(12) United States Patent
Sorias et al.

(10) Patent No.: US 9,413,179 B2
(45) Date of Patent: Aug. 9, 2016

(54) DETACHABLY INTEGRATED BATTERY CHARGER FOR MOBILE CELL PHONES AND LIKE DEVICES

(71) Applicants: Yeoshua Sorias, Brooklyn, NY (US); Max Moskowitz, Flushing, NY (US)

(72) Inventors: Yeoshua Sorias, Brooklyn, NY (US); Max Moskowitz, Flushing, NY (US)

( * ) Notice: Subject to any disclaimer, the term of this patent is extended or adjusted under 35 U.S.C. 154(b) by 255 days.

(21) Appl. No.: 13/937,648

(22) Filed: Jul. 9, 2013

(65) Prior Publication Data

US 2015/0015204 A1    Jan. 15, 2015

(51) Int. Cl.
| | |
|---|---|
| *H02J 7/00* | (2006.01) |
| *H01M 2/02* | (2006.01) |
| *H01M 2/06* | (2006.01) |
| *H01M 2/00* | (2006.01) |
| *H01M 2/10* | (2006.01) |
| *H04M 19/08* | (2006.01) |

(52) U.S. Cl.
CPC ............. *H02J 7/0042* (2013.01); *H02J 7/0044* (2013.01); *H01M 2/00* (2013.01); *H01M 2/02* (2013.01); *H01M 2/0202* (2013.01); *H01M 2/06* (2013.01); *H01M 2/1005* (2013.01); *H02J 7/00* (2013.01); *H02J 7/0045* (2013.01); *H04M 19/08* (2013.01)

(58) Field of Classification Search
CPC ......... H02J 7/00; H02J 7/0042; H02J 7/0044; H01M 2/06; H01M 2/1005; H01M 2/1022; H01M 2/02; H01M 2/0202; H01M 2/00; H01M 2/0207; H04M 19/08
USPC ......................................... 320/107, 111, 114
See application file for complete search history.

(56) References Cited

U.S. PATENT DOCUMENTS

| | | | | |
|---|---|---|---|---|
| 5,611,701 A | * | 3/1997 | Hahn | H01R 24/66 439/131 |
| 5,628,641 A | | 5/1997 | Hahn | |
| 5,648,712 A | | 7/1997 | Hahn | |
| 5,780,993 A | * | 7/1998 | Tsang | H02J 7/0042 320/111 |
| 5,829,993 A | * | 11/1998 | Wu | H01R 27/00 439/131 |
| 5,838,554 A | | 11/1998 | Lanni | |
| 5,847,545 A | * | 12/1998 | Chen | H01R 29/00 307/18 |
| 6,091,611 A | | 7/2000 | Lanni | |
| 6,184,652 B1 | | 2/2001 | Yang | |
| 6,191,553 B1 | | 2/2001 | Feng-Jung | |
| 6,241,538 B1 | | 6/2001 | Chen-Yung | |
| 6,585,530 B2 | | 7/2003 | Steiret et al. | |
| 7,166,987 B2 | | 1/2007 | Lee et al. | |

(Continued)

OTHER PUBLICATIONS

Sorias, et al. v. *Nat'l Cellular, et al.*, First Amended Complaint, Civil Action No. 1:14-cv-2897 dated May 27, 2014.

(Continued)

*Primary Examiner* — Stacy Whitmore
(74) *Attorney, Agent, or Firm* — Ostrolenk Faber LLP

(57) ABSTRACT

A cell phone charger comprises a main body having embedded therein a charging circuit configured to receive line AC voltage and to convert it to a DC voltage suitable for charging the mobile device. AC prongs fold into the body in a stowed position and a connection structure formed integrally with the main body grasps onto and holds the charger secured to the cell phone device. In a preferred embodiment, the AC prongs pivot independently and lie flat against an outside surface of the main body. In a further embodiment, the AC prongs are concealed by a cover plate in their stowed position.

11 Claims, 23 Drawing Sheets

(56) References Cited

U.S. PATENT DOCUMENTS

| | | | |
|---|---|---|---|
| 7,489,952 B2 | 2/2009 | Simoes et al. | |
| 7,889,498 B2 * | 2/2011 | Diebel | G06F 1/1628 361/679.41 |
| 8,712,482 B2 * | 4/2014 | Sorias | H02J 7/0042 320/111 |
| 8,712,486 B2 * | 4/2014 | Sorias | H02J 7/0042 439/131 |
| 9,088,670 B2 * | 7/2015 | Sorias | B25G 3/18 |
| 2002/0142812 A1 | 10/2002 | Goodman | |
| 2004/0036449 A1 | 2/2004 | Bean et al. | |
| 2005/0195089 A1 | 9/2005 | Shomali | |
| 2011/0159930 A1 | 6/2011 | Garrett et al. | |
| 2013/0052871 A1 * | 2/2013 | Eklind | H02J 7/0042 439/620.21 |
| 2013/0057215 A1 * | 3/2013 | Rajeswaran | G06F 1/1626 320/111 |
| 2013/0078832 A1 * | 3/2013 | Vardanyan | H01R 27/00 439/131 |
| 2014/0035511 A1 * | 2/2014 | Ferber | H02J 7/0042 320/103 |
| 2014/0176071 A1 * | 6/2014 | Alammari | H02J 7/00 320/111 |

OTHER PUBLICATIONS

*Sorias, et al.* v. *Nat'l Cellular,et al.*, Counterclaim of Defendants Pliner, Gladstone and Prong, LLC, Civil Action No. 1:14-cv-2897 dated Aug. 15, 2014.

Office Action mailed Sep. 13, 2013 in corresponding U.S. Appl. No. 13/546,307.

Office Action mailed Sep. 4, 2013 in corresponding U.S. Appl. No. 13/348,066.

International Search Report for corresponding Intl Application No. PCT/US2012/021021 mailed on May 29, 2012.

International Search Report for corresponding Int'l Application No. PCT/US2012/021021 mailed on Jul. 16, 2013.

International Search Report and Written Opinion in related International Application No. PCT/US2012/021021 mailed on May 29, 2012.

International Preliminary Report on Patentability and International Search Report in related International Application No. PCT/US2012/021021 issued on Jul. 16, 2013.

\* cited by examiner

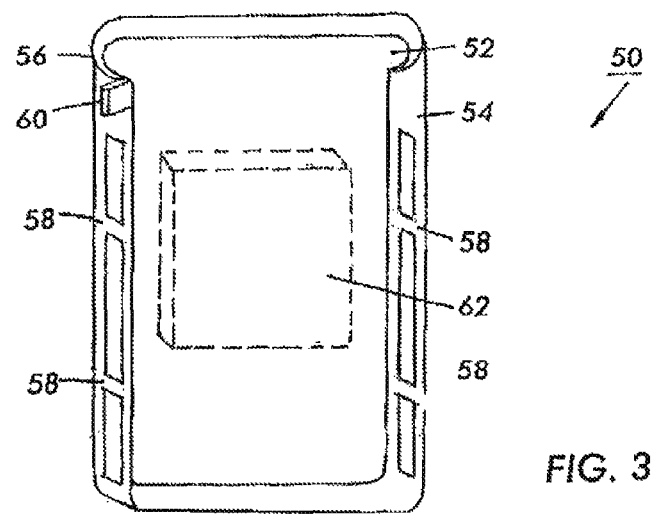
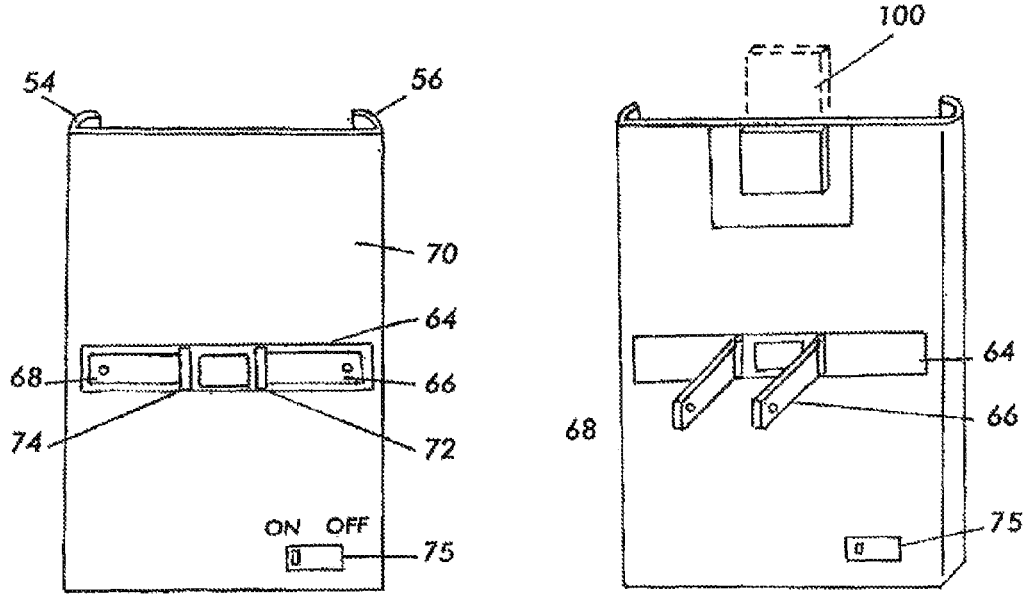

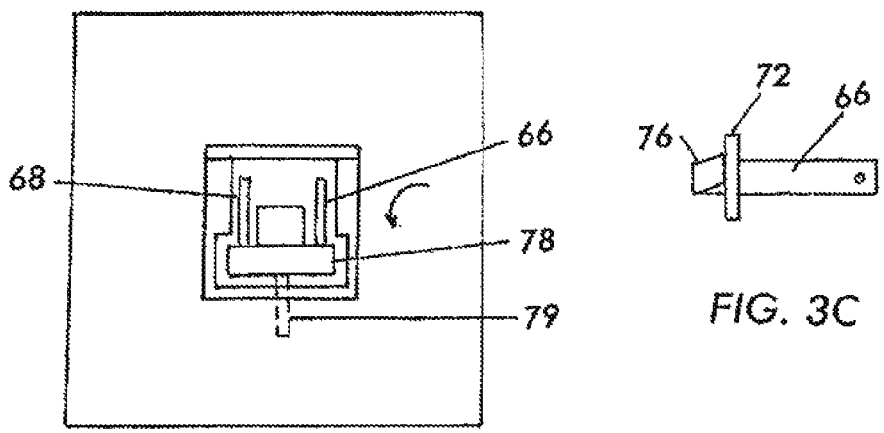
FIG. 3D
FIG. 3C
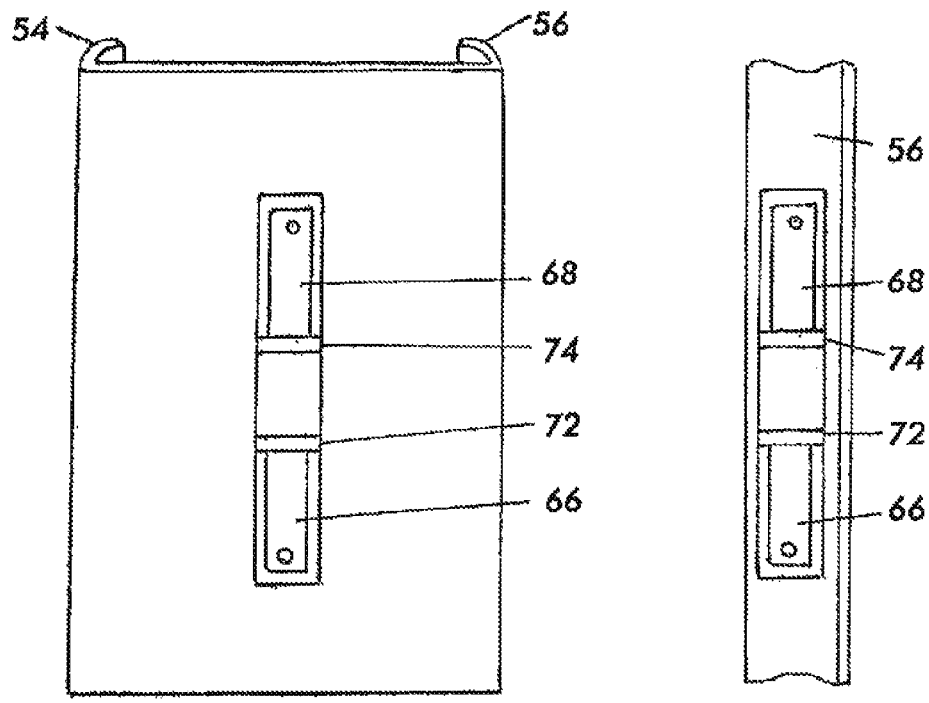
FIG. 3E
FIG. 3F

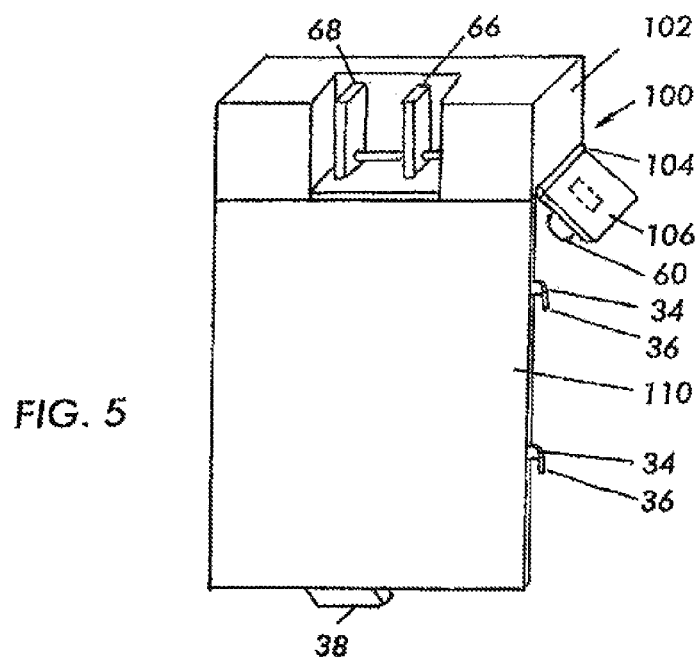
FIG. 5
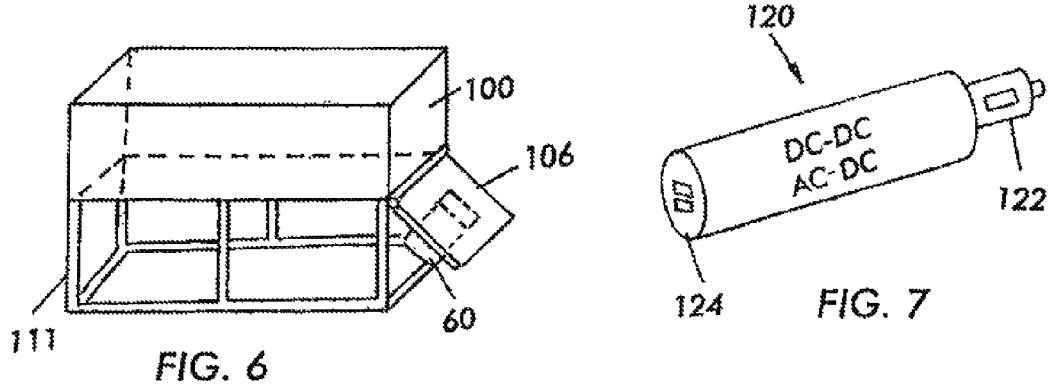
FIG. 6
FIG. 7
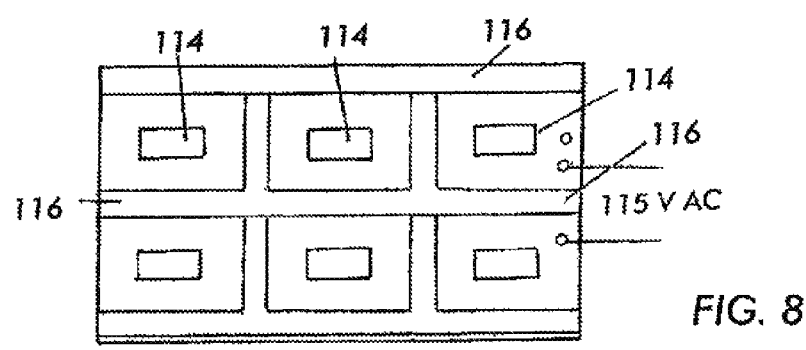
FIG. 8

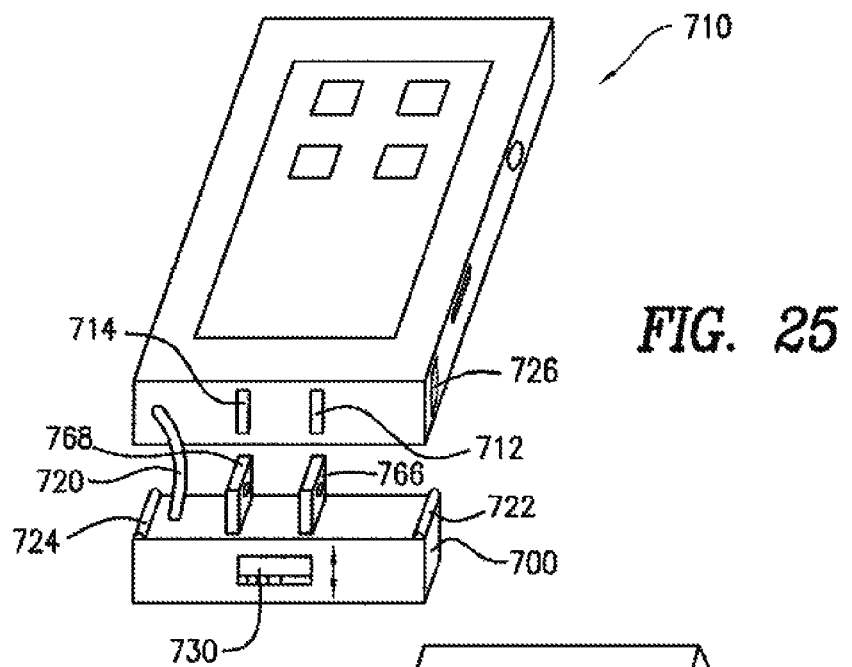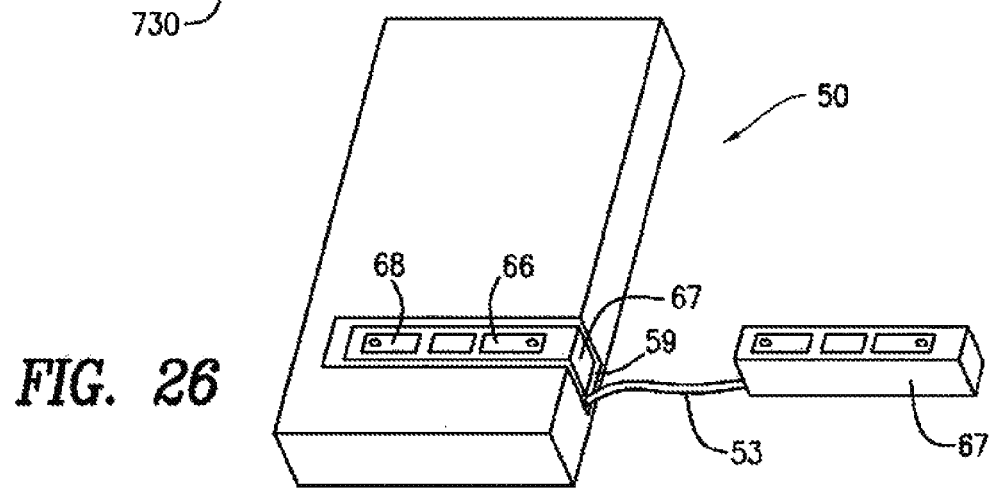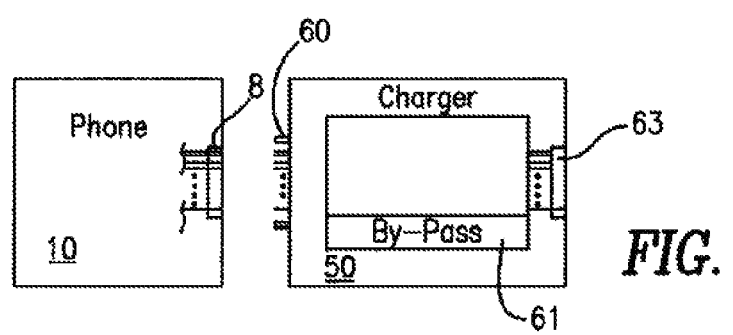

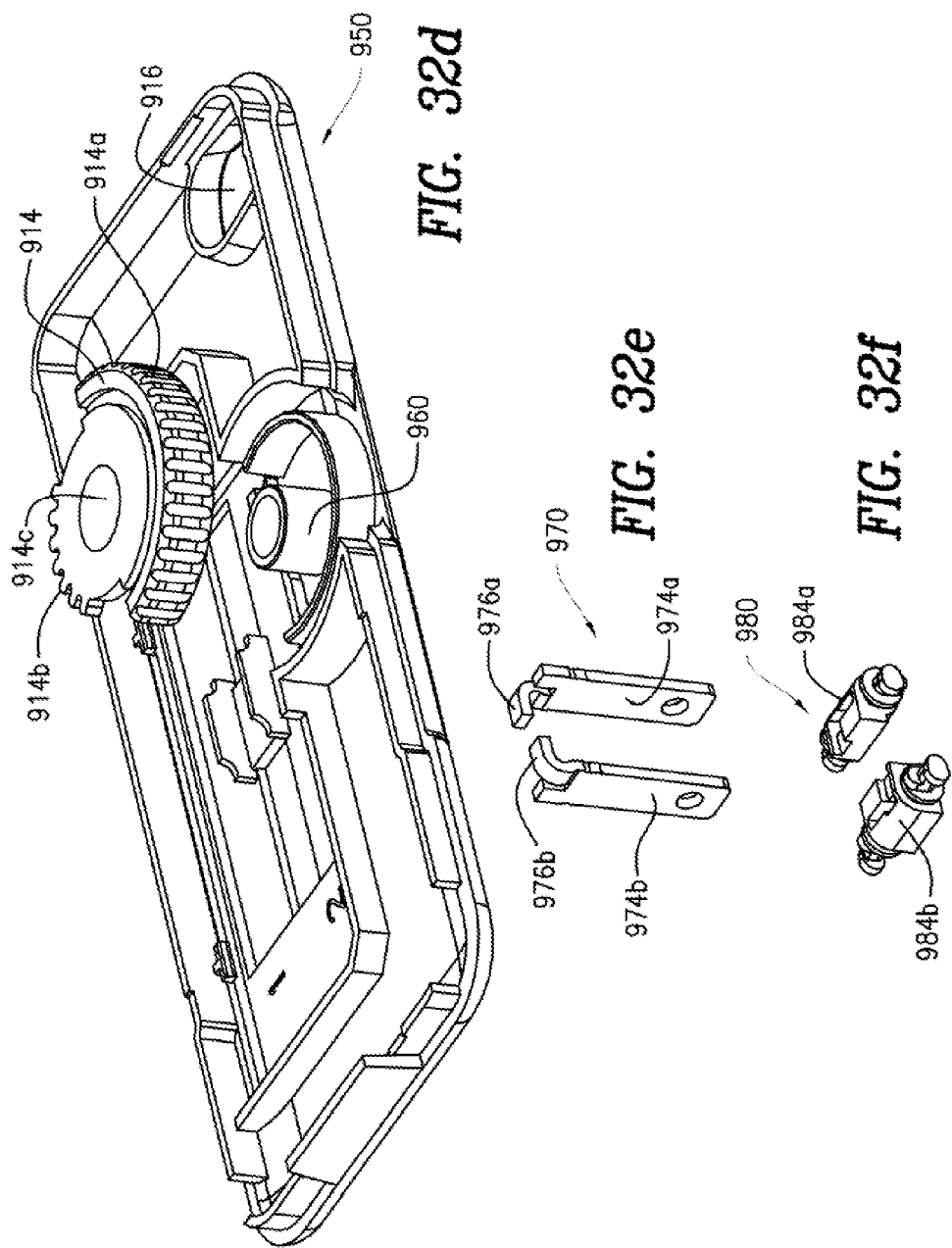

DETACHABLY INTEGRATED BATTERY CHARGER FOR MOBILE CELL PHONES AND LIKE DEVICES

BACKGROUND OF THE INVENTION

The present invention is generally directed to a battery charger and, more particularly, to a battery charger for cell phones and like mobile devices which is constructed to be detachably integrated with the body of the cell phone, with minimal alteration of the cell phone's weight and/or dimensions.

The present invention is rooted in the inspired realization by the present inventors that the explosive and unrelenting adoption by hundreds of millions, if not billions, of people of the cellular cell phone as the primary communication device, requires renewed focus on its charger circuitry and on the method and approach to charging cell phones, PDAs, and mobile communication devices generally.

Personal computing and communication devices such as the familiar cell phone, or the digital communication devices such as the famous Blackberry® and similar devices have been uniquely designed to be hand-held. They generally have a box-like, rectangular shape with a specific height, width and thickness dimensions that vary from device to device. The width of the typical cell phone is generally in the range from 4 to 7 centimeters or even 8 cm, with a height of approximately 10 cm and a thickness on the order of from 7 to 20 mm.

These devices are provided, as a rule, with a charging port in the form of a small connector within a wall socket measuring on the order of 2 to 3 mm in depth and about 7 mm in length. In a typical application, users are provided with separate charging devices, which consist of a charger body from with an AC electrical plug with a pair of prongs that can be inserted into an AC wall socket carrying 115 v or 220 v, and a long cable which terminates in a diminutive charging plug which can be inserted into the charging socket of the portable cell phone or like device. Such chargers are sometimes provided with a charger body which is designed to fit into an automobile 12 volt (or similar) DC power source, which power source is then converted to a voltage which is compatible with the voltage and current requirements of the particular mobile device.

Carrying around these charging devices is bothersome and annoying. Men typically carry their mobile devices either in their pockets or tethered to their belts. They do not typically lug around bothersome chargers, which they usually keep either on their office desks or at home. With women, the situation is a bit easier because they often carry their portable cell phones in their handbags, which provide more space to also store the battery charger. But the annoyance still remains because the long cable and the charger do not lend themselves to easy and neat keeping in a pocket or in a handbag. All too often, men and women find themselves in situations where their cell phone is about to become fully discharged with no convenient means of charging them.

To the present inventors' knowledge, the prior art has not conceived of and has certainly not provided a means which allows the mobile device to incorporate within its body or be mechanically integrated with a charging device which becomes part of the cell phone, and which allows the electrical plug to be swung out from within the cell phone and to be directly inserted into an 115/220 volt AC wall socket.

SUMMARY OF THE INVENTION

It is an object of the present invention to provide a battery charger for mobile electronic devices which is configured to be detachably attached, in a manner which allows it to become an integrated part of the cell phone itself without unduly increasing the size or overall dimensions of the cell phone device.

It is a further object of the invention to provide battery charger body which is shaped and configured to snap or slide onto the back of a cell phone, hugging the cell phone body tightly, like a bottom cover, and which has integrated therein the charger which adds only a minimal amount to the thickness of the cell phone.

It is yet another object of the invention to provide a same type of charger which can be flush with either the length and width of the cell phone or one which extends from the right side or left side or the top or bottom dimensions of the cell phone and which has an integrated charger therein with an electrical plug that can be swung out from its body in a manner that allows its direct insertion into a conventional electrical AC socket.

The foregoing and other objects of the invention are realized by means of a charger which has a main body with a charging circuit embedded therein, wherein the charging circuit is configured to receive a line AC voltage and to convert it into a DC voltage suitable for charging a mobile device, as well as AC prongs foldable into the main body in a stowed position and pivotable out of the main body in an operable position. A connection structure is formed integrally with the main body in a manner which allows it to extend from the main body and in a configuration which allows the connection structure to grasp onto and hold the charger secured literally integrally to the mobile device for which it is intended. In addition, a charger plug is integrally formed with the charger and located on the charger such as to allow the charger plug to be inserted into a charging port of the mobile device, so that the charger is essentially substantially permanently connected physically and electrically with a mobile device during the use of the mobile device, allowing the AC prongs to be positioned in an operable position for charging a mobile device while the mobile device is in use.

In accordance with other features of the charger, its main body is a generally flat body with a substantially uniform thickness dimension, where the thickness is on the order of 4 to 25 mm, preferably less than about 12 mm or even more preferably less than about 8 mm, as compared with the length and width dimensions, which are on the order of several centimeters, for example, about 5 cm in width and 10 cm in length.

In one embodiment, the connection structure comprises left and right resilient holding panels which grasp the sidewalls of the mobile device and have large cutouts to avoid obstructing any electrical switches or buttons of the mobile device. Also preferably, the AC prongs are folded along the width or the length, with the thickness dimension of the prongs being received in a trough formed in the main body of the charger so that the prongs penetrate only a distance of 2 or 3 mm into the main body.

In other embodiments, the connection structure is formed as the removable back cover of the mobile device and utilizes the built-in connection mechanism of the mobile device.

Other features and advantages of the present invention will become apparent from the following description of the invention which refers to the accompanying drawings.

BRIEF DESCRIPTION OF THE DRAWINGS

FIG. 3 is a perspective of the present invention showing a cell phone jacket with a main body in which is located a charging circuit and with side panels designed to snap around and hold onto the side walls of the handheld mobile communication device of FIG. 1.

FIG. 3A shows a rear view of the charger jacket of FIG. 1, with AC power prongs folded flush with the back body surface of the charger.

FIG. 3B shows the rear view of the charger jacket of FIG. 3A with the prongs in an operable position.

FIG. 3C shows structural details of operation of the prongs.

FIG. 3D shows an alternate embodiment of the folding mode of the AC prongs.

FIG. 3E shows the AC prongs of FIG. 3A, with a vertical orientation.

FIG. 3F shows the AC prongs of FIG. 3E located on the side panel.

FIG. 5 shows an alternative embodiment of the charger jacket of FIG. 3, showing a charging body with an attachment panel which replaces the conventional cover of the mobile device shown in FIG. 2.

FIG. 6 shows a further charger circuit embodiment which, like FIG. 5, is provided along the top of the mobile device, so as to provide a longer cell phone and charger combination, while maintaining the thickness dimension of the mobile device.

FIG. 7 shows an automobile charging accessory for the charger of FIGS. 3-6 of the present invention.

FIG. 8 shows a board layout for the invention, which also serves as a heat sync for dissipating energy.

FIG. 25 perspectively illustrates another mechanism for a small body charger for a mobile electronic device.

FIG. 26 perspectively illustrates another charger embodiment for a phone.

FIG. 27 illustrates a connector designed for signal flow through.

DETAILED DESCRIPTION OF EMBODIMENTS OF THE INVENTION

Figure 1:
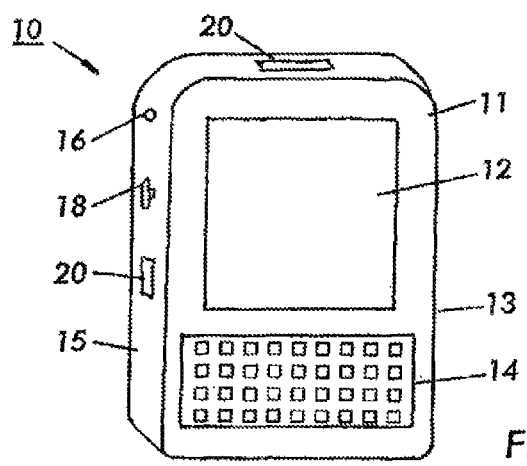
FIG. 1 is a perspective of a typical hand-held mobile communication device, illustrating its overall rectangular shape and comparative dimensions and component layout.

With reference to FIG. 1, shown therein is a conventional, handheld mobile device 10, which may be any cell phone device, such as the now popular iPhone® line of phones, or the phones provided by the many other manufacturers in the field, including the Blackberry®. The communication device 10 of FIG. 1 has a generally rectangular shaped body 11 with dimensions as mentioned before and with a front panel featuring a display 12 and a keyboard 14. Of course, the device 10 may be of the type having a touchscreen, instead of a keyboard. Along the sides are various controls and connectors, including, for example, an audio output connector 16 and an interface circuit which also serves as a charging port 18, and various on/off switches 20 and other controls.

Figure 2:
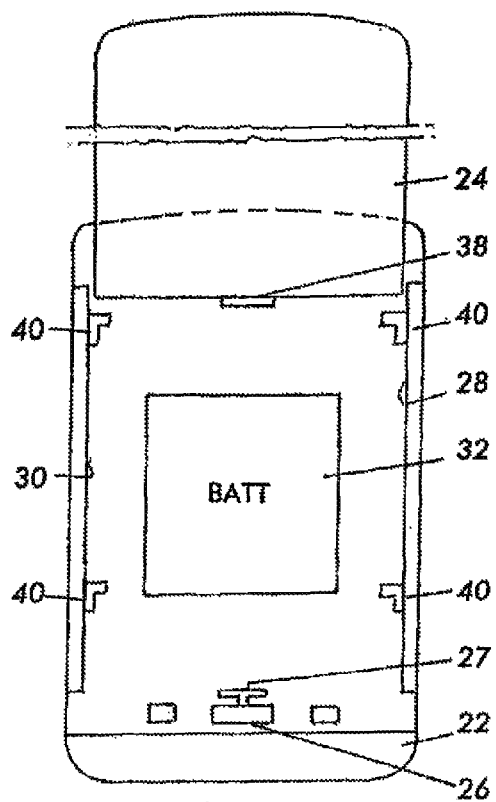
FIG. 2 is a back view of the mobile device of FIG. 1 with cover partially removed, exposing the internal battery and mechanism for attaching the cover.
Figure 2A:
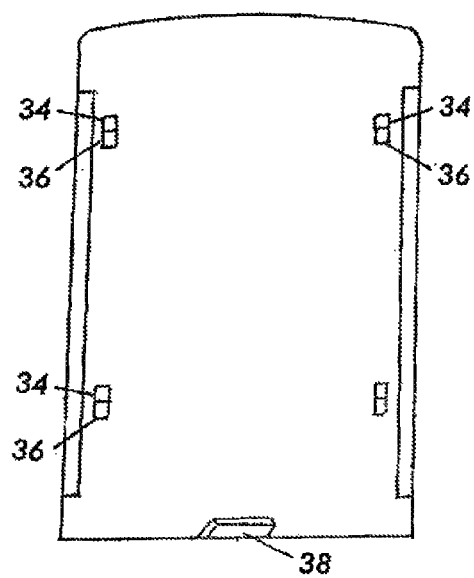
FIG. 2A provides a view of the back side of the cell phone cover of FIG. 2.

Turning to FIG. 2, in typical fashion, the mobile device 10 has a backside 22 with a removable panel or cover 24, which is typically released by pressing a release button 26, which allows the cover 24 to slide in grooved channels 28, 30, to expose a tightly packed compartment, including a battery 32. As is well known and also as shown in both FIG. 2 and FIG. 2A, the backside of the cover 24 has tongues 34 with catches 36, as well as a lock catch 38. When that cover 24 is placed facing down and in registrations with the slots 40 in the main body of the mobile device 10, it fits in and can slide until its catch 38 is caught and locked in the catch bar 27, which bar can be released by pressing the button 26.

Turning to FIG. 3, in order to avoid tampering with the mobile device 10 (and so possibly compromising warranties and/or to simplify its use), the invention provides a jacket style charger unit 50 which has the general configuration of a jacket with a back panel 52 which has a thickness of several millimeters and in which is embedded the charging circuit described below, or like charging circuits. The generally flat back panel 52 of the charger jacket 50 is flanked by left and right hugging panels 54, 56 which are inwardly curved, resilient and designed to either allow the mobile device 10 to be slid therebetween, or to be forcefully snapped onto the back side of the mobile device 10 and grasp and hold the side walls 13, 15 of the mobile device 10 (FIG. 1). As further shown in FIG. 3, a bottom panel 55 is also provided, whereby the mobile device slid into the charger jacket is flanked on three sides thereof as said panels 54, 56 and 55. To avoid blocking or obstructing access to the various controls typically found on the sidewalls 13, 15 and along the top of the mobile device 10, the resilient panels 54, 56 are largely cutout and have only several joining ribs for rigidity, which allow full access to the electrical connectors, switches and ports.

Alternatively, instead of the resilient panels, one may use straps, for example, rubber straps by which the charger is held to the phone body.

In addition, the charger jacket 50 of FIG. 3 also has a connector 60 which provides a male plug which routes the charging signals into the charging connector 18 (FIG. 1). In use, the connector 60 is aligned with the socket 18 and then the charger 50 is swung from the other side, whereby a direct connection is made between the charging circuit 62 (described below) and the internal battery 12 of the mobile device 10 for the purposes of the charging thereof.

Turning to FIG. 3A, the rear of the charger jacket 10 is shown to have a shallow trough 64 a few millimeters deep, e.g., 2-4 mm, in which lie folded down the righthand side and lefthand side, AC prongs 66, 68 which are mounted inside the trough or recess 64 flush with the outer surface 70. Also shown is a miniature on/off switch 75, whose function shall be described immediately below. Each of the AC prongs 66 and 68, is designed to pivot around a respective longitudinally extending axis 72, 74 at its base, whereby each prong can be swung out from the body and extended out in a manner shown in FIG. 3B. To maintain the prong position perpendicular to the body of the jacket charger 50, a bottom of the prong is shown to have a pointed, generally rectangular, detent 76, which when the prong is swung out, snaps into an underlying recess (not shown) which allows the prong to reliably holds its perpendicular position. The side of the detent 76 also serves to maintain each prong flat against the flat bottom of the trough 64, in the stowed position. As shown, the AC prongs 66, 68 pivot in opposite directions, e.g., to the left and to the right. However, a person of ordinary skill in the art would readily recognize that they can have a length which is equal to approximately the separation therebetween and they both can pivot to the right or both can pivot to the left and a mechanism may be provided to slide a lever that lifts both of them simultaneously and similarly stows both of them simultaneously.

When the jacket charger 50 is mounted on the cell phone 10, it enables the cell phone to be easily carried around and held in one's hand, with only about 5 mm or so being added to the thickness of the mobile device 10, which does not detract from the comfort of carrying the mobile device around, while providing the peace of mind and convenience of being able to recharge the cell phone at any time by simple plugging into any AC wall socket (and while simultaneously even using the device). The detent mechanism 96 of FIG. 3C can be configured so that the distal ends of the prongs are more spaced apart (compared to at the base), but held resiliently in a manner which allows the AC plug to tightly grab the wall AC socket while supporting the weight of the mobile device 10.

In FIG. 3D, the AC prongs 66, 68 are oriented such that their common pivoting axis 78 is coextensive and the width dimension of the prongs fits inside the jacket. In this embodiment, it is naturally so that the thickness of the jacket would be somewhat increased, which in certain embodiments, may not pose or present any drawback. In other words, the two prongs pivot together and their width dimension lies in the thickness dimension of the charger body. Also, as a further alternative, the plug in FIG. 3D is not pivotal within the cutout in the body, but is rather connected to the charging circuit via a short AC cable 79 which measures less than 5 inches, so that the plug can be retrieved and inserted in an AC wall socket in situations where it might be difficult for the body of the charger to lie flush against the wall socket.

In FIG. 3E, the two pivoting axes 72, 74 of the prongs 66, 68 are oriented to extend along the width of the charger jacket 50, with the prongs oriented along the length of the device to provide an even greater space for the prongs, increasing the length thereof where necessary. In FIG. 3F, the prongs, 66, 68 are located on the side panel 56, for increasing ease of connection to an AC wall socket and avoiding entirely covering or obstructing access to said wall power socket.

Figure 4:
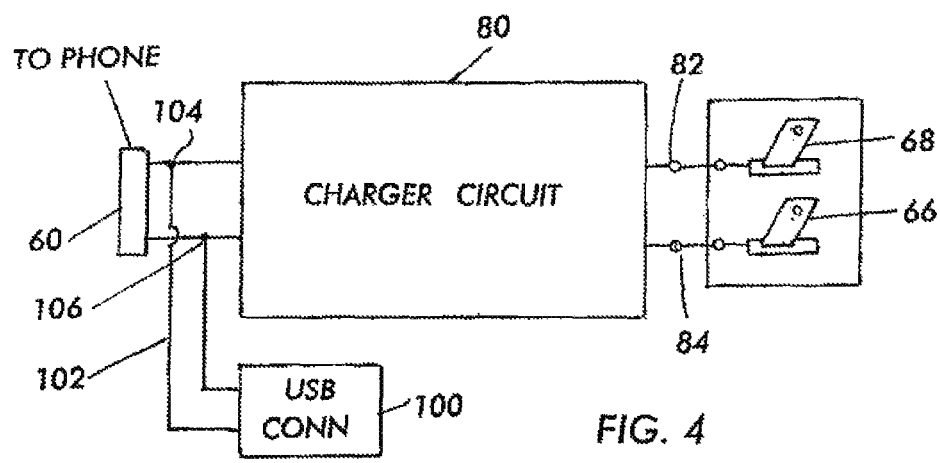
FIG. 4 is a circuit and layout diagram of the charging circuit of the present invention.
Figure 4A:
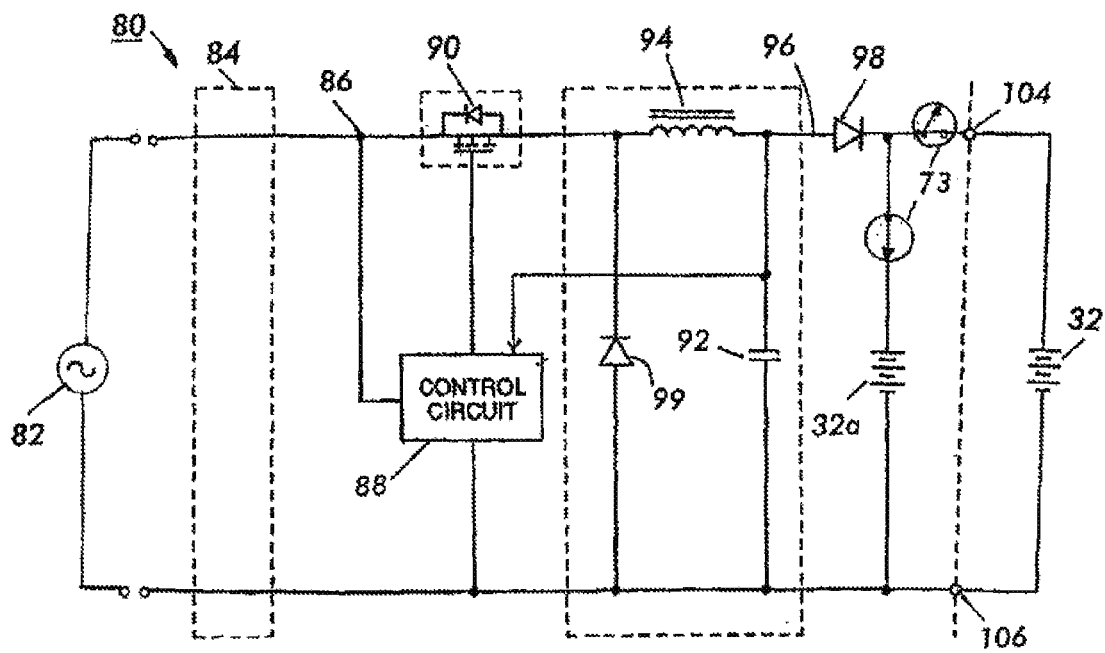
FIGS. 4A and 4B provide examples of internal circuits of the charging circuit.

Turning to FIG. 4, shown therein is the typical arrangement, whereby a charging circuit 80, such as shown in FIG. 4A, is embedded in the back panel of the charger 50, and connected at one end to terminals 82, 84 for receiving the hot and ground terminal inputs from the AC prongs 66, 68 previously described and for outputting at the other end thereof, a DC voltage at plug 60, which voltage is slightly higher than the battery's 32 nominal voltage, in order to effect the charging function, in well known fashion.

FIG. 4A illustrates a typical prior art design of a charging circuit 80. Thus, the AC input 82 can be provided to a circuit block 84 which may represent either, according to one design, just a connector block, or, according to another design, a rectifying circuit, which could be a half wave or a full wave AC rectifier, to produce a positive voltage at the input 86 into the control circuit 88. In accordance with another embodiment, the block 14 represents a transformer which steps down the 115 or 220 volt AC input to a lower magnitude AC voltage suitable for the charging circuit 80, via a diode (not shown).

Figure 4B:
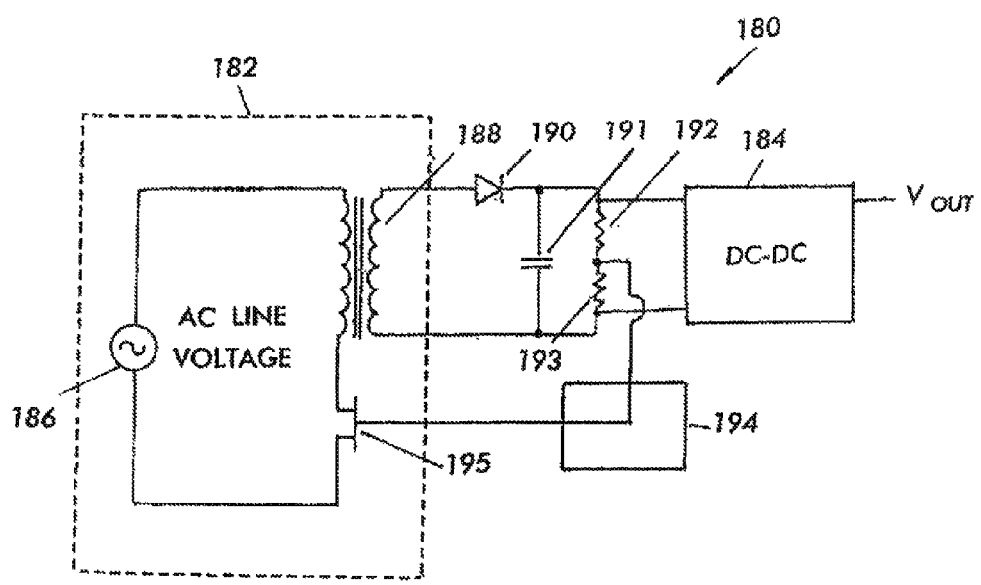

The charging circuit 80 comprises, as is well known, the mentioned control circuit 88, which repetitively turns on and off and also controls the duty cycle of a power switch 90 which allows just the right amount of electrical charge to pass to charge capacitor 92. The charging current is smoothed by an inductor 94 which charges the capacitor 92, maintaining the necessary low DC voltage at the output 96 of the charging circuit, which voltage is fed to the battery 32, via the blocking, forward biased diode 98. The output of the capacitor 96 is also fed back to the control circuit 88 to provide a closed loop for voltage control purposes. The diode 99 provides a current path for the back EMF of the inductor 94. The foregoing is just a representative charging circuit, and an example of the dozens of such circuits widely known in the art. The design can use a buck converter, various DC to DC schemes and operate at extremely high frequencies to reduce the dimension of a transformer (used for AC isolation) if needed. A DC to DC circuit portion can be provided before or after the transformer or even at both locations, as should be readily apparent to one skilled in designing low voltage, DC output power supplies. An example circuit is illustrated in FIG. 4B. This charging circuit 180 uses a forward converter 182, which generates a smaller DC voltage for the AC-DC converter 184. Thus, an AC source 186 drives a transformer 188 which is turned on and off at a high rate, for example, on the order of 100 kHz (or even at a megahertz rate) in order to realize a small sized transformer, generating a burst of AC power pulses which are rectified by the diode 190. The capacitor 191 stores a DC voltage across resistor dividers 192, 193. The voltage between the resistor dividers is tapped for a controller 194 which provides the high-speed on/off control and drives the switching resistor 195, all in well-known manner. This circuit provides the needed AC isolation and an implementation which can be realized with a transformer of a very small size owing to the high speed of operation thereof, again in well-known manner.

The output current may be on the order of 600 mAmps, which is conventional for some mobile phones or only, say 300 mAmps, trading off speed of charging but gaining a still smaller charger circuit size.

The charger 50 may incorporate within a spare battery 32*a* (see FIG. 4A), and the switch 73 may be a double pole switch so operable that in one position current passing through diode 98 charges the phone battery 32 and in the other position the spare battery 32*a*. Thus, the spare battery may be used to charge the regular battery when AC power is unavailable (for example, in an automobile, on a bus or plane, etc.). Alternatively, the switches 73 may be small value resistors (possibly of slightly different values), so that both batteries 32, 32*a* can be charged and provide power to the mobile device. One or more LED lights (not shown) may be provided in series with the battery 32*a* to show when it is being charged or discharged by providing power to the phone.

In accordance with a further feature, an optional USB connector 100 allows bypassing the charging circuit 80 to provide charging current via lines 102 that connect to charging connector 60, at nodes 104 and 106. See FIGS. 4 and 4A. In FIG. 3B, the USB connector is shown slidably integrated into a charger body.

In alternatives to the jacket style charger 50, FIG. 5 shows a charger 100 which is designed not to increase the thickness of the cell phone, but rather, its length. The charging circuit 80 herein is housed in a small, rectangular body 102 which has approximately the same width and thickness as the mobile device 10 and which sits atop (or on the bottom) thereof. In the device 100 of this embodiment, the AC prongs 66, 68 can be fitted along the back thereof, as described previously, or owing to the greater thickness of the charger 100, can be embodied inside its body 102, as shown in FIG. 3D. Via a living hinge 104, a small plasticized ribbon 106 supports thereon the DC plug 60, which is precisely positioned so that it can be swung into the charging socket 18 of the mobile device 10. It will be readily recognized that the chargers herein would be designed in each instance to fit a particular style of mobile device, matching its particular width, length and thickness dimensions and the location of its charging port 18.

The charger 100 of FIG. 5 is designed to be connected to the cell phone 10 without at all grabbing on or obstructing the side panels. Herein, the charging circuit body 102 has a connecting panel 110 which in every respect is constructed to mimic the dimension, shape and function of the cell phone cover 24 of FIG. 2. It is also integral with and extends from the body 102 and supports it. Here, the mobile device cover 24 is removed and the extension panel 110 is inserted and attached to the cell phone's existing cover holding mechanism, inasmuch as the panel has the same tongues 34, 36 and catch 38 which allows it to be connected in such a manner that the rear of the cell phone is not obstructed in any way and the panel 110 also may have the openings for a camera lens or a flashlight, as typically found, for example, on a Blackberry® and other cell phone devices.

In yet another embodiment, in lieu of the panel 110, a cage-like plasticized body 111, as shown in FIG. 6, is provided which allows the charger 100 to be slipped on the top of the cell phone with a latticework that basically blocks nothing requiring access by the cell phone user on the body of the mobile device 10.

In general, the charger styles described herein allow for the electrical components of the circuit 80 to be spaced over a substantial area of even as high as 50 cm square. In order to achieve the thin profile of the jacket 50, it is intended herein that the circuit components, such as those shown in FIG. 4A, are especially configured to use flat components 114 and in many instances, for resistor, diode, particularly capacitors components to use several discrete components in parallel (or serial), in order to distribute the heat dissipation and reduce the thickness dimensions of each component while attaining the appropriate resistance, capacitance and heat disposition values. For example, a resistance of 100 ohms can be implemented as two resistors of 200 ohms each (or two 50 ohm serial resistors), where each resistor dissipates only one-half the generated heat. This is, for example, shown in FIG. 8, which shows the components to be small, flat and widely spaced. In addition, the internal jacket 50 can be lined with heat conducting metal paths 116, so that any heat generated within is more easily and efficiently spread over a greater area and more effectively dissipated.

Please note that the switch 72 shown in FIGS. 3A, 4A, allows the charger to be electrically disconnected from the charging socket 18 of the mobile device 10, to avoid any issue of the battery 32 discharging through the charger 50 during periods when the charger is not connected to an AC wall socket. This function can be provided by the aforementioned diode 98.

As a further accessory, FIG. 7 shows a plug-style DC to DC or a DC to AC converter circuit 120, the details of which are well known in the art, provided in a body that includes a plug 122 that fits the conventional 12 volt power plug in automobiles and which outputs at the other end thereof, its output voltage at a socket 124 which is indistinguishable from the conventional AC socket. Thus, leaving that plug inside one's automobile allows the cell phone to be simply inserted therein during driving, so maintaining the cell phone fully charged and/or charging it, if necessary. The body shape of the plug 120 may extend straight or be contoured so that the socket 124 extends toward the driver with the cell phone resting on top of the socket, for hands free operation during driving, if appropriate.

In general, the present invention describes a charger body in which the ratio of the body thickness dimension to the product of the length and width dimensions thereof is considerably lower than in the prior art. For example, the length, width and thickness of a prior art charger measuring, respectively, 6×4×2 centimeters yields a ratio of 0.083. Here, a charger body measuring 10×6×1 centimeters yields a ratio of 0.017. The inventors intend to encompass charger body styles where that ratio is equal to or less than 0.05.

In accordance with a further embodiment, the charging circuit 80 of FIG. 4A or a like circuit is embedded into a cell phone holder 200 which can be clipped to a person's clothing, typically a belt. See FIG. 9. The cell phone holder 200 has a first body component 202 which is pivotally attached to a clip 204 through a spring-biased pivot 206 with a contact point between holder body parts 202 and 204 at a bottom portion 208, whereby the holder can be clipped onto a belt of person, in well-known manner. A round or oval, or even square catch 214 is attached to the holder body 202 via a projection 212 forming a hook 210 onto which the telephone which is provided with the previously described jacket 51 can be hooked by the jacket 51 being formed with a holding structure 53 with an opening 55.

The holder body 202 comprises within the charging circuit 80 which receives AC power via foldable AC prongs 66 and 68 (see FIG. 3E), further via AC wires 69 which pass through the pivot structure to the body 202.

The DC charging power is passed through the stem 212 and onto electrical contacts 214 formed on the catch 214. The electrodes 216 mate with similar electrodes 57 on the jacket 51 and thus, DC charging power is conducted via routing wires 59 to the charging plug 60, as previously described.

Figure 9:
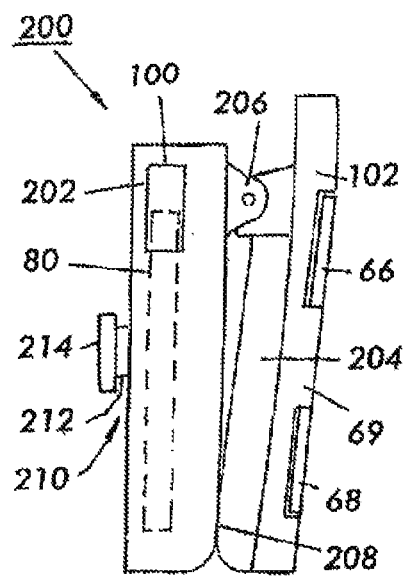
FIG. 9 is a schematic of a cell phone belt clip housing a charging circuit.
Figure 9A:
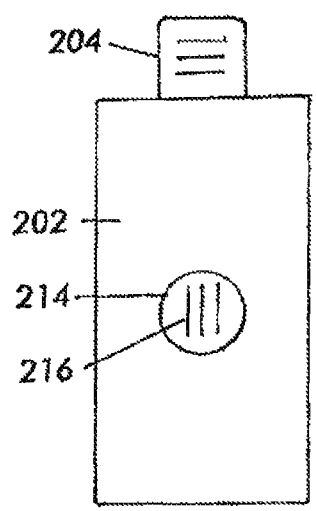
FIG. 9A is a left side view of FIG. 9.
Figure 9B:
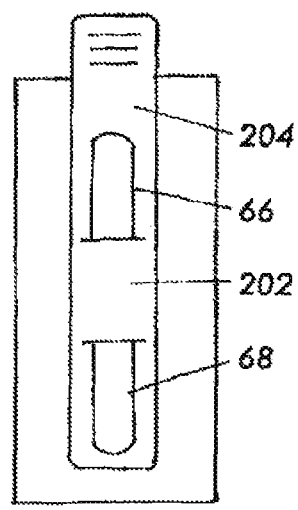
FIG. 9B is a right side view of FIG. 9.

As in a prior embodiment, a USB connector 100 can be provided within the body 202 and slid out so that it can be connected directly to supply charging power to the electrodes 216 shown in FIG. 9A.

Figure 10:
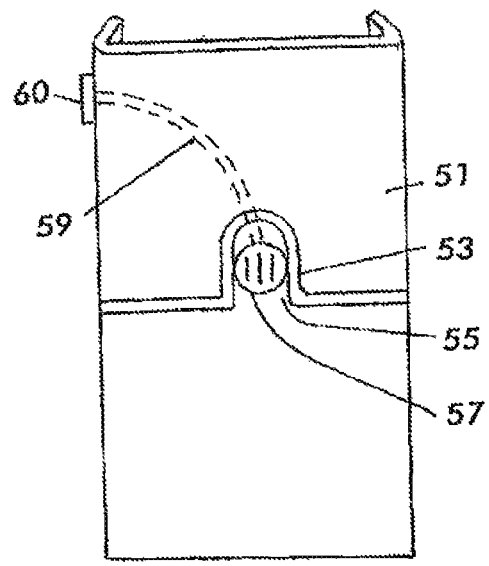
FIG. 10 shows a cell phone jacket designed to be hooked onto the belt clip of FIG. 9.

Using the embodiment of FIG. 9 through FIG. 10, the supporting cell phone belt holder 200 doubles as a case for a charging circuit. The basic arrangement of cell phone belt holder is described in greater detail in U.S. Patent Publication No. 2003/0000976, the contents of which are incorporated herein by reference in their entirety. As before, a telephone charger which is embedded in a holder is realized in a small size. For example, the body portion 202 might typically measure about 6 cm in length, 3 cm in width, and 1 to 1½ cm in thickness. The belt holder can be designed and optimized for clipping a wall panel inside a lady's handbag or in any carrying case, whereby it can be carried by men and ladies alike. This charger can also be used in an automobile by using the adapter previously described relative to FIG. 7.

With the present invention, a highly integrated charger having an appealing appearance which does not mar the body style of the cell phone and does not appreciably increase its dimensions, has been described. The device avoids the drawbacks of the prior art, which require users to lug around separate chargers, both for their automobiles and for home use in the manner originally described.

The foregoing description of the invention inherently embodies the following features and aspects, as well as others not previously explicated, as elaborated below.

Thus, in the preceding description, the charger 50, per se, has been described as a stand-alone device that can be secured to the electrical device, i.e., to the cell phone, by being clipped or fitted to it in various ways. Alternatively, as already mentioned, the charger itself can be integrated with the phone by forming or replacing its cover. However, it is inherent and implicit in the previous description, that the described charger can be physically integrated as to become an integral part of the very body of the portable device at the factory, so that it would not be separable by the end user from the phone. Nothing in the foregoing description needs to be altered to realize the mentioned embodiment, where the charger and the portable electronic device are integrated in a single housing. As mentioned, the portable device may be a phone, a music or video player, a PDA, a tablet, and the like, the main objective herein being that these phones, etc., which often have thicknesses on the order of about 10 mm, and even less, can be fitted with a charger that adds no more than a few millimeters to that thickness dimension, with the charger having AC prongs that lie flat in the charger, so that the main body plane of the charger is substantially parallel to the main body plane of the portable device. In general, the charger 50 preferably has a substantially (meaning mostly) flat and thin rectangular body (with possibly rounded corners), with one surface that substantially matches the phone wall surface which it abuts. In other words, the thickness dimension is preferably substantially uniform. Naturally, deviations as by providing a small bulging section (or sections) is still to be deemed that the charger is substantially flat. Certainly, bulging over only 25 percent or less of the charger surface can be ignored. Also, the overall shape of the charger need not be rectangular as it could be oval, round, triangular etc. The side walls may be beveled or rounded.

Figures 11, 12:
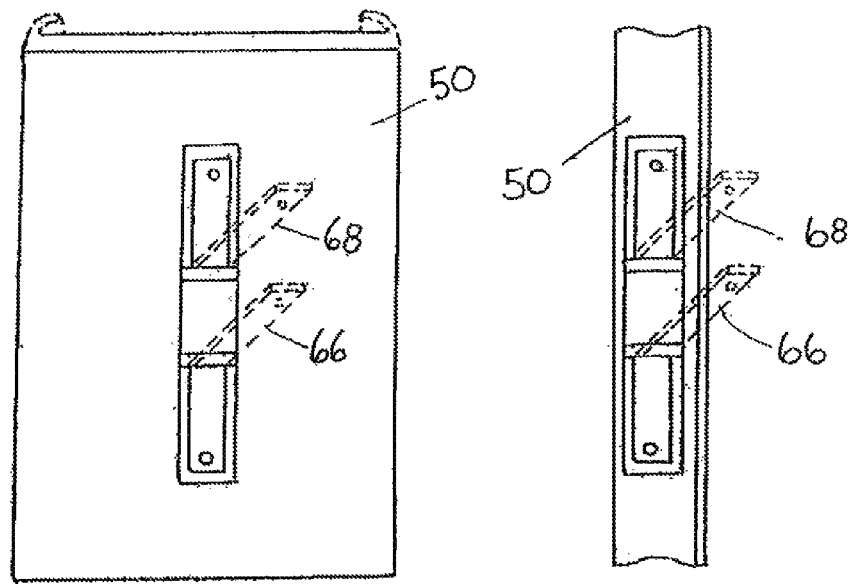
FIG. 11 is a further developed view of FIG. 3E.
FIG. 12 is a further developed view of FIG. 3F.

Additional variations or aspects are possible, including the ones described below. Referring to FIGS. 11 and 12, shown herein in dashed lines are the AC prongs 68, 66 in their elevated positions, where they have been elevated out of the plane of the charger in order to allow them to be inserted into an AC wall socket in one's home, office, and the like.

Figure 13:
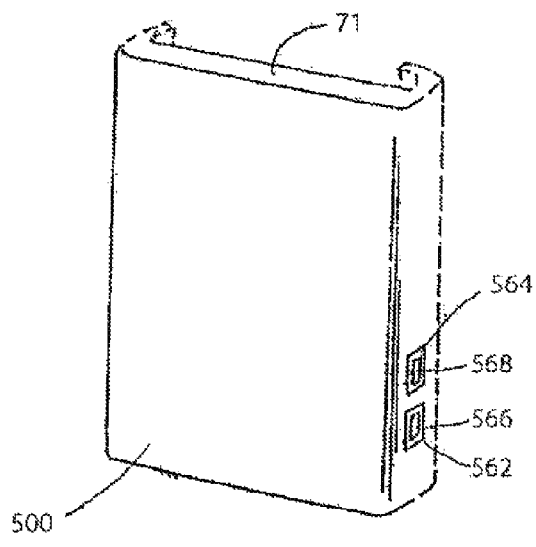
FIG. 13 is a perspective of a further embodiment for concealed flat lying AC prongs ("flat prongs").
Figure 14:
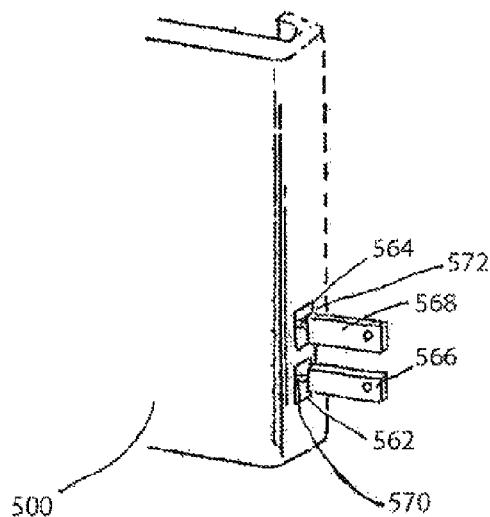
FIGS. 14 and 15 show different stages of the exposing of the flat prongs of FIG. 13.
Figure 15:
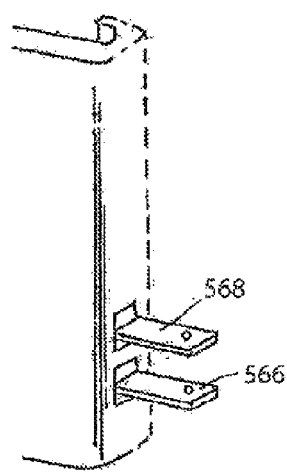

Referring to FIG. 13, the phone charger 500 has a main body thickness 71 in which, through one side end thereof, flat lying AC prongs 568, 566 are capable of emerging from within the body 71 through respective interior channels 564, 562. Through a slider, for example, the slider 582 shown in FIG. 16, which can be slid to the right, and which is coupled to the prong 568, 566, these AC prongs can be pushed out of the body 71, as shown in FIG. 14, in which state, the charger in the AC prongs 568, 566 are in a position where they might be used in European-style AC sockets, but not in the United States-style sockets. To that end, these prongs 568, 566 are mounted on a pivot axis 564, 562 which enable them to be rotated to the position shown in FIG. 15, and thereby make them usable in the United States-style AC sockets. Interiorly, the prongs remain in contact with conductive contacts which route the AC signals to the circuitry shown in FIGS. 4 and 4A. Alternatively, the prongs may be oriented as in FIG. 15 while still within the body 71 or within the phone 10 (FIG. 1).

Figure 16:
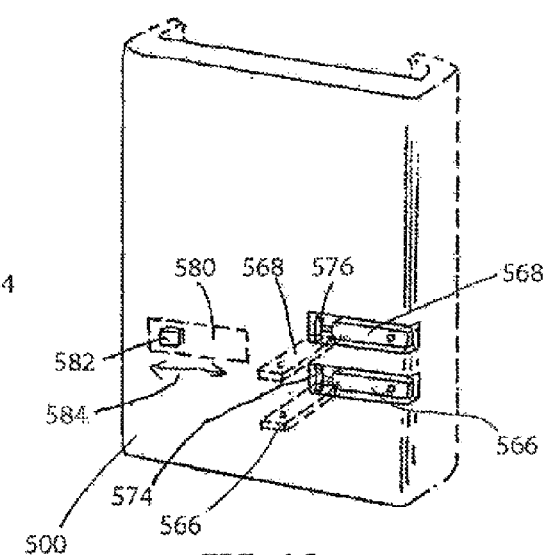
FIG. 16 is a perspective of yet another embodiment for flat prongs.

Referring to FIG. 16, here, the AC prongs 568, 566 are not concealed within the body 71, but rather lie in open channels and each prong can be pivoted about its respective pivot axis 576, 574, and then turned to the position shown in dashed lines to achieve the ends of the present invention. As noted, the slider 582 can be used for that purpose. That slider can be moved partially inside a depression or cutout 580 in the body 71. The arrow 584 indicates the back and forth movement of the slider 582, which achieves the objectives of the present invention.

Figure 17:
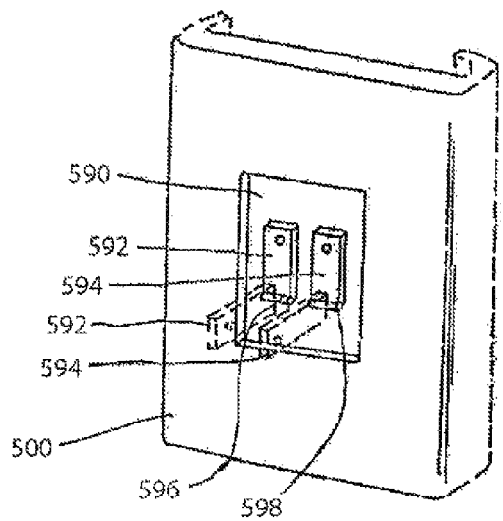
FIG. 17 is a still further embodiment of an arrangement of flat prongs.

Similar to the prior embodiments, in FIG. 17, the AC prongs 592, 594 are located in a cutout 590 in the body 71, and can be pivoted about their respective pivot axes 596, 598 and then rotated to the position shown in the dashed lines to achieve the same end as described previously.

Figure 18:
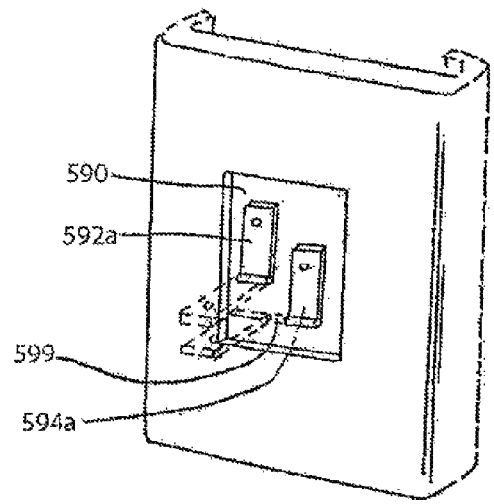
FIG. 18 is a still further embodiment of flat prongs.

In FIG. 18, the prongs 592a, 594a can be pivoted around their pivot axes and subsequently the bottom prong 592b can be slid to the left on its pivot axis 599, so it aligns with the upper AC prong 590 as shown in dashed lines.

Figure 19:
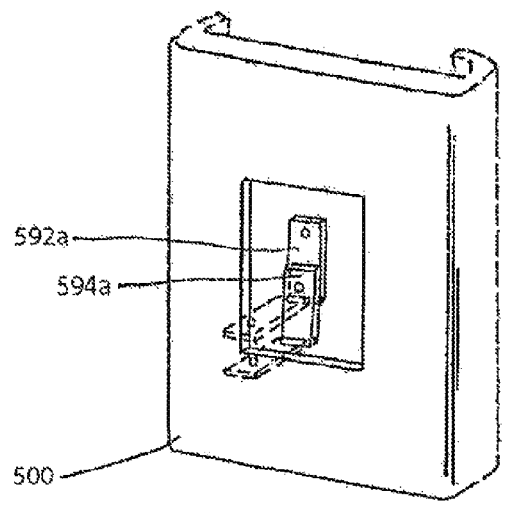
FIG. 19 is yet another embodiment for flat prongs.

In FIG. 19. the prongs 592b, 594b overlie one another and can be pivoted to the operational position as shown in dashed lines.

Various mechanisms can be deployed to raise and lower the mentioned prongs, including as shown in FIGS. 20-24.

Figure 20:
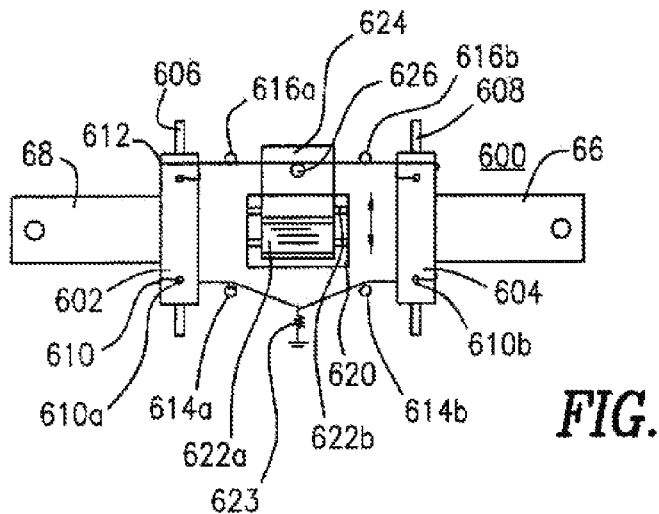
FIG. 20 is a diagram illustrating a slide switch mechanism for raising and lowering flat prongs.

Referring to FIG. 20, AC prongs 68, 66 are respectively mounted to their respective pivoting bodies, each of which has pivoting pins 606, 608, which are mounted within a recess so that the pivoting bodies 602, 604 are capable of rotating, but not translating. A tight spring wire 610 has one end fixed to the pivot body 602 at 610a and the other end at 610b on the pivot body 604. The wire is spring-like, owing to which, it will constantly exert a strong counterclockwise pull on one pivot and a clockwise pull on the other, assuring that the prongs 68, 66 are always drawn or biased to lie flat in the body of the charger (in the plane of the paper). A similar wire 612 wound on the same axis and passing by pins 616a, 616b can be pushed up by a catch 626 located on a slider body 622, so that when the knob 620 is slid within the cutout 620, it will move up, pulling on the wire and working against the spring force of the wire 610, raise the prongs 68, 66 to extend perpendicularly to the plane of the charger. The knob 622a has a bottom detent which catches within a groove located on a groove 622b located as shown, allowing its position to hold against the force of the spring wire 610. If desired, the spring 610 can be also biased with physical spring 623 that pulls on it in the plane of the charger.

Figure 21:
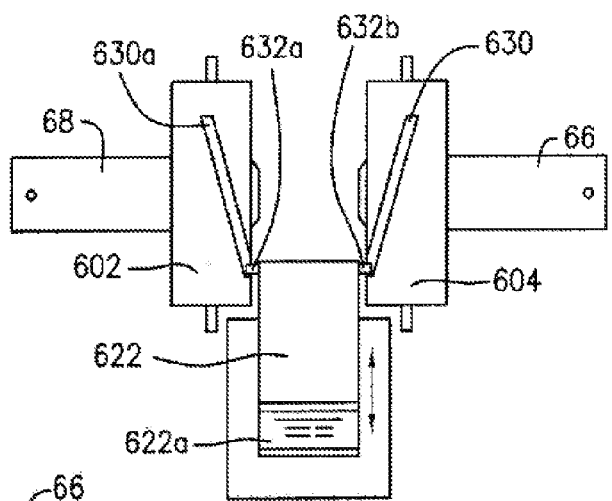
FIG. 21 is a further mechanism for raising and lowering flat prongs.

In the alternate embodiment of FIG. 21, the pivot bodies have inclined grooves 630a, 630b, respectively, in which pins 632a, 632b of the slider 622 can slide. When the slider body 622 is moved by pushing on the knob 622a, the pins 632a, 632b ride in the groove 630a, 630b and rotates the prong 68, 66 to the upright position. This embodiment has the advantage that it does not require any metallic springs.

Figure 22:
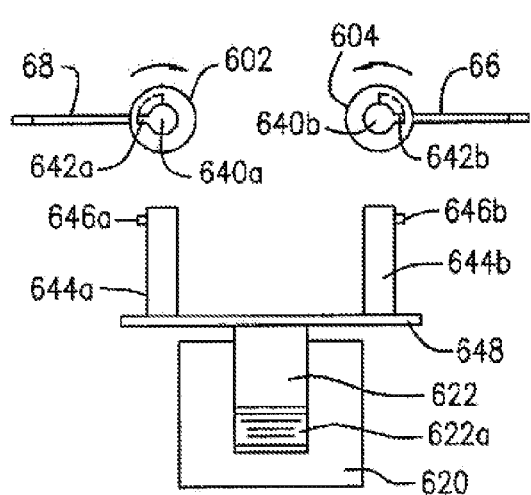
FIG. 22 is still another embodiment for raising and lowering flat prongs.

In FIG. 22, the grooves are formed inside these bodies 640a, 640b in which are internally formed the inclined grooves 642a, 642b, whereby when the prongs 644a, 644b associated with the slider 622 ride inside within the bodies of the pivots, they will rotate them in a self-evident manner. The two slider pins 644a, 644b are connected by joining bar 640a which is connected in-turn to the slider body 622, and so uniformly turning the prongs.

Figure 23:
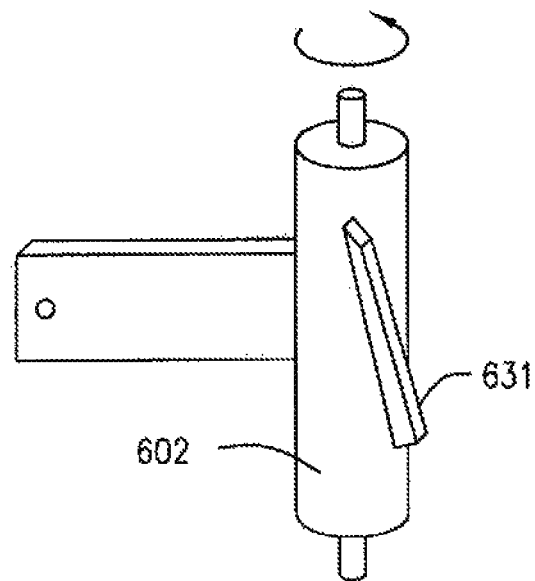
FIG. 23 is a still further mechanism for raising and lowering flat prongs.

In FIG. 23, each pivot, for example, the pivot body 602, can have instead of a groove, a protruding catch 631 that is inclined to the axis or the body 602, as shown. The companion pivot body has a similar protrusion which extends in an opposed orientation. Therefore, when the slide body 622, having the pins 632a, 632b, engages these projections 631, it will inherently rotate the bodies 602, 604 to raise the associated prongs from their normally stowed position.

Figure 24:
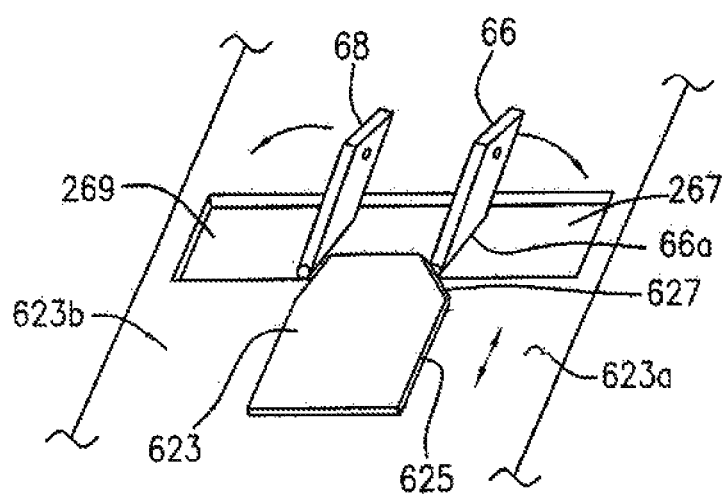
FIG. 24 is yet another mechanism for raising and lowering flat prongs.

Lastly, in FIG. 24, prongs 68, 66 are spring biased internally to stand upright (for example, using a spiral, mouse trap style spring (not shown), or as previously described). When the slider body 625 is pushed between the prongs, its initial narrowed body portion 627 begins to push and pivot the prongs to the right and to the left, respectively, until the wider body portion 623 of the slider 625 overlies the pins (partly or totally) and keeps them down. Thus, the wider portion of the slider can be as wide as the extent of the prongs and totally cover them, so that no portion of the prongs is visible when the slider has been pushed sufficiently forwardly, providing improved aesthetics. For example, the wider portion 623 can be widened to include the portion 623a at the right and 623b at the left, to cover and conceal, respectively, the locations 267 and 269 of the flattened prongs 66, 68, rendering the prongs invisible in their stowed position.

In a further embodiment of the invention, and as illustrated in FIG. 25, the charger 700 has prongs 766, 768 that can be inserted into a new type of a phone 710 that has sockets 712, 714 into which the charger 700 can be inserted so as to attach and integrate the phone and the charger into a single body. To charge the telephone, the body 700 is pulled out and rotated into an AC socket and, thus, is able to provide charging power through a cable 720 which is associated with the telephone 710. If desired, in this embodiment too, the prongs 766, 768 can lie flat and the charger 700 located under the phone is attached to the phone via snaps 722, 724 that fit in grooves 726 formed on the phone body itself. Regardless, when the charger is not in use, it has the appearance of a single phone device whereby it is simply an extension of the phone itself. If desired, a USB port-style or an Apple-style connector 730 is provided within the charger 700, which can be slid, and thereby inserted into the charging slot of the phone, dispensing with the need for the physical cable 720.

In the description provided above relative to several of the Figures, including FIGS. 11-19, it should be noted that the shape of the prongs can be round, to fit the requirement of AC prongs in certain countries of the world. Note further that the present invention can be used with foldable phones. In a further embodiment of the invention, the bottom one-third to one-half of the extension of each of the prongs 66, 68 can be coated with an insulating material 66a (FIG. 24), whereby even if one were to stick very slim fingers between the back of the charger when it is inside an AC wall socket, he/she would not be able to touch any prong surface which is "hot". Preferably, only the outside surface of the prong is coated, and not the inside surfaces of the prongs which face each other.

Still further, in FIG. 3, a charging connector 60 that is flexibly mounted is shown. However, that connector 60 can be configured to point inwardly, so that it fits directly into socket on the phone. Alternatively, the connector 60 can be provided on the bottom panel in FIG. 3, pointing upwardly, so that a telephone can be slid through the top and directly connected to the charger, particularly when the phone is an iPhone®, where the connecting plug is at the bottom of the phone.

The charger of the present invention can be also implemented so that the charger provides a plug on the inside, which allows connecting to the input connector of the phone itself through the body of the charger. Thus, when the charger is not plugged into the AC socket, the connector allows access so that all the phone input lines are accessible from the outside straight through the charger body. For example, with reference to FIG. 27, the invention provides a system and mechanism whereby when the charger 50 has its interface connector 60 coupled to the input connector 8 of the phone 10, the user's access to the phone connector 8 is physically blocked. However, in accordance with the present invention, the bypass arrangement in circuit 61 allows the input connector 63 in the charger 50, which is constructed to be a perfect replica of the connector 8 allows the user to couple signals through the connector 63 to the phone connector 8 via the action of the bypass circuit 61. For example, the signal lines (not necessarily including the power charging lines) may flow straight through from the connector 63 to the connector 8 when the charger is connected to the phone. Alternatively, a multiplexer may provide the choice based on the position of a switch (not shown). The charger itself may contain a local, long-life battery for providing this functionality.

In FIG. 26, the folded AC prongs 66, 68 are located in a groove 59 within the body of the charger 50 or the phone 10 and can be slid out and then opened to charge the phone with the prong body 67 being tethered by an AC cord 55 to the charger or to the phone, as shown. The AC cord 55 may be wound on an internal spiral metal spring, so that it easily pull back into the body.

Figure 28A:
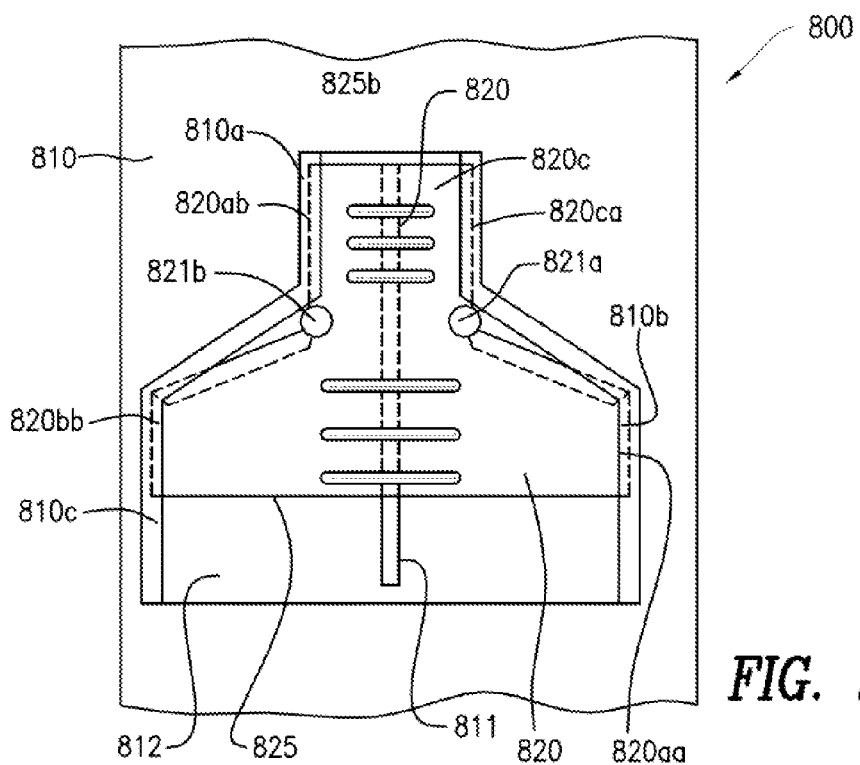
FIG. 28 is a schematic illustration which builds and elaborates on the embodiment shown in FIG. 24.
Figure 28B:
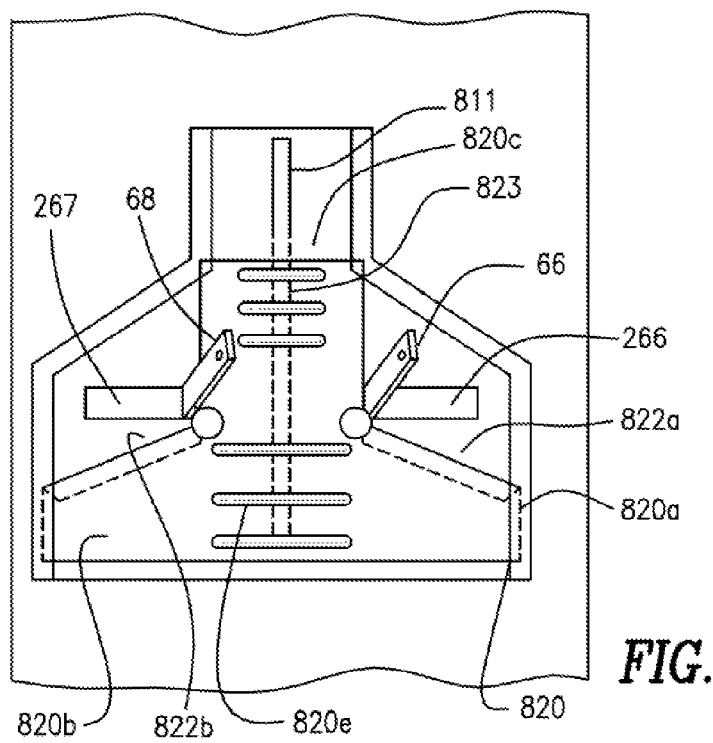

Referring to FIG. 28, its sections (a) and (b) show the same overall charger in two states of operation. The charger housing 800 has a front side (not shown) shaped and configured to hold the telephone, as generally previously described (e.g. FIG. 3). It also has a rear wall 810 which defines an opening 812 exposing prong stowing wells 266 and 267 for respective AC prongs 66 and 68. A winged slider 820 has right and left wings 820a, 820b, and a front portion 820c which has defined thereon several parallel ridges 820e, which provide finger friction to allow the slider 820 to slide in the space 812 from the position shown upward in the space 812 to entirely cover the prongs 66 and 68, as shown in section (a) of FIG. 28. Side edges (820ca, 820cb) of the front portion 820c slide underneath the wall 810 in slider channels 810a, while side edges (820aa, 820bb) of the wings (820a, 820b) slide in channels 810b, 810c.

Most importantly, the leading slanted edges 822a (of the wing 810a) and 822b (of the wing 810b) engage and push down on the upright prongs 66 and 68, forcing them into their respective wells 266, 267, as the slider 820 is pushed upward, until the prongs are entirely concealed. The leading edges are both slanted and canted (i.e. undercut, as indicated by dashed parallel lines) on their leading edges to facilitate the forcing down of the prongs (against the spring force that holds them up) in the figure. In the position of the slider in the closed position (FIG. 28, section (a)), the prongs are entirely concealed, as noted above. In addition, camming projections (821*a*, 821*b*) project above the surface of the slider 820, to initially engage the upright prongs (66, 68) to begin their pivoting to the right and left, into the wells (266,267), to initiate the prongs' engagement by the leading edges (822*a*, 822*b*) of the slider 820. An advantage of this embodiment is that the AC prongs 66, 68, which are spring loaded, do not jump out of the case, but rather are gradually released from their stowed position and gradually pushed back in, in direct proportion to the degree to which the slider is moved in either direction.

Preferably, an underside, T-shaped projection 823 snaps into and is held within a further sliding channel 811 in the body of the charger, to hold the slider 820 and prevent it from bulging up owing to the spring force of the prongs. Alternatively, the slider plate 820 may be instead hinged at its edge 825*a* and pivoted up/down, like a door, to conceal or expose the prongs 66, 68, with a catch 825*b* being provided to hold the hinged door in its closed position.

FIGS. 29-35 implement the foregoing concept of entirely concealing the AC prongs when they are not in use, as follows.

Figure 29:
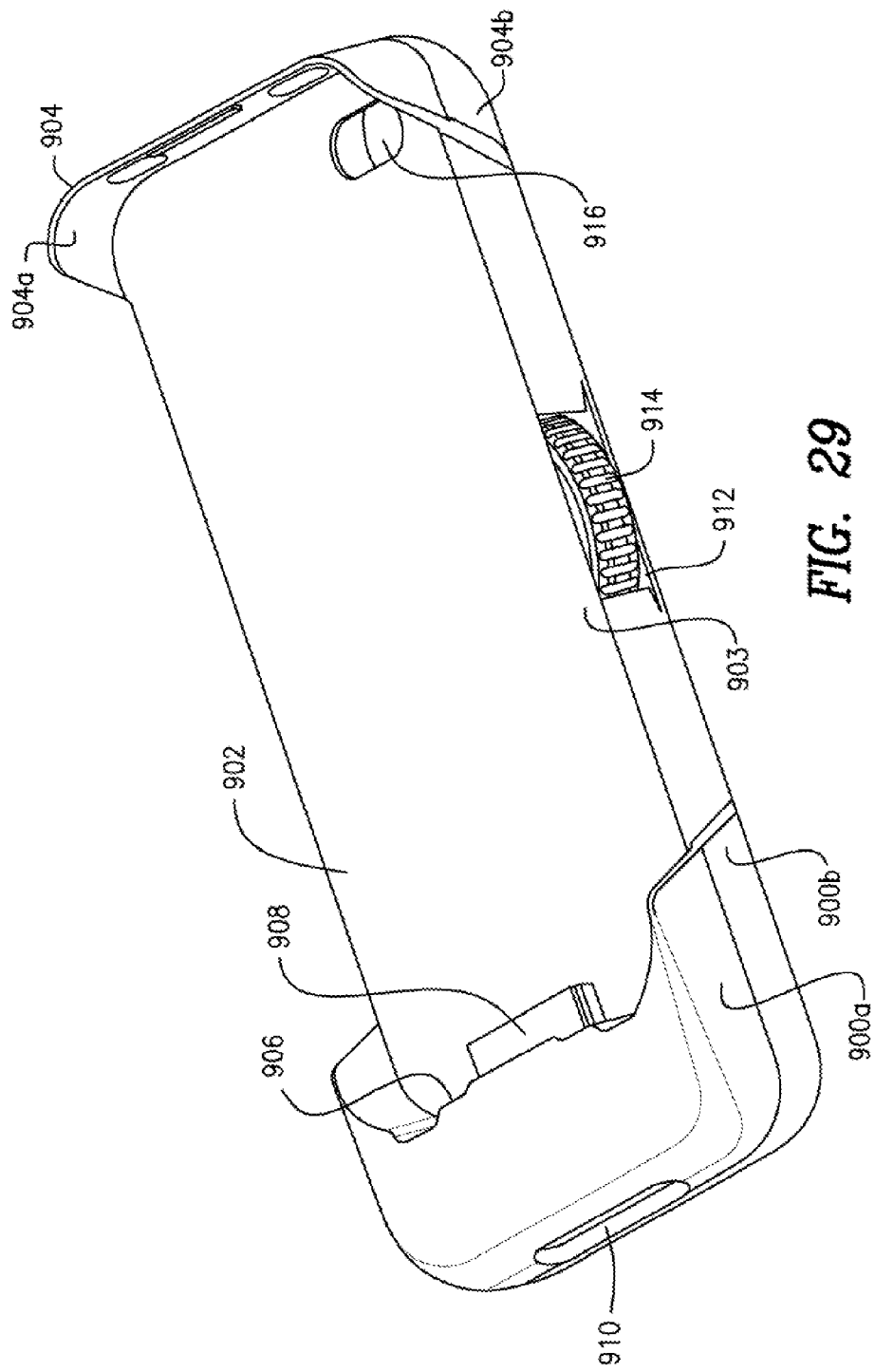
FIG. 29 respectively illustrates another charger embodiment for a phone.
Figure 30:
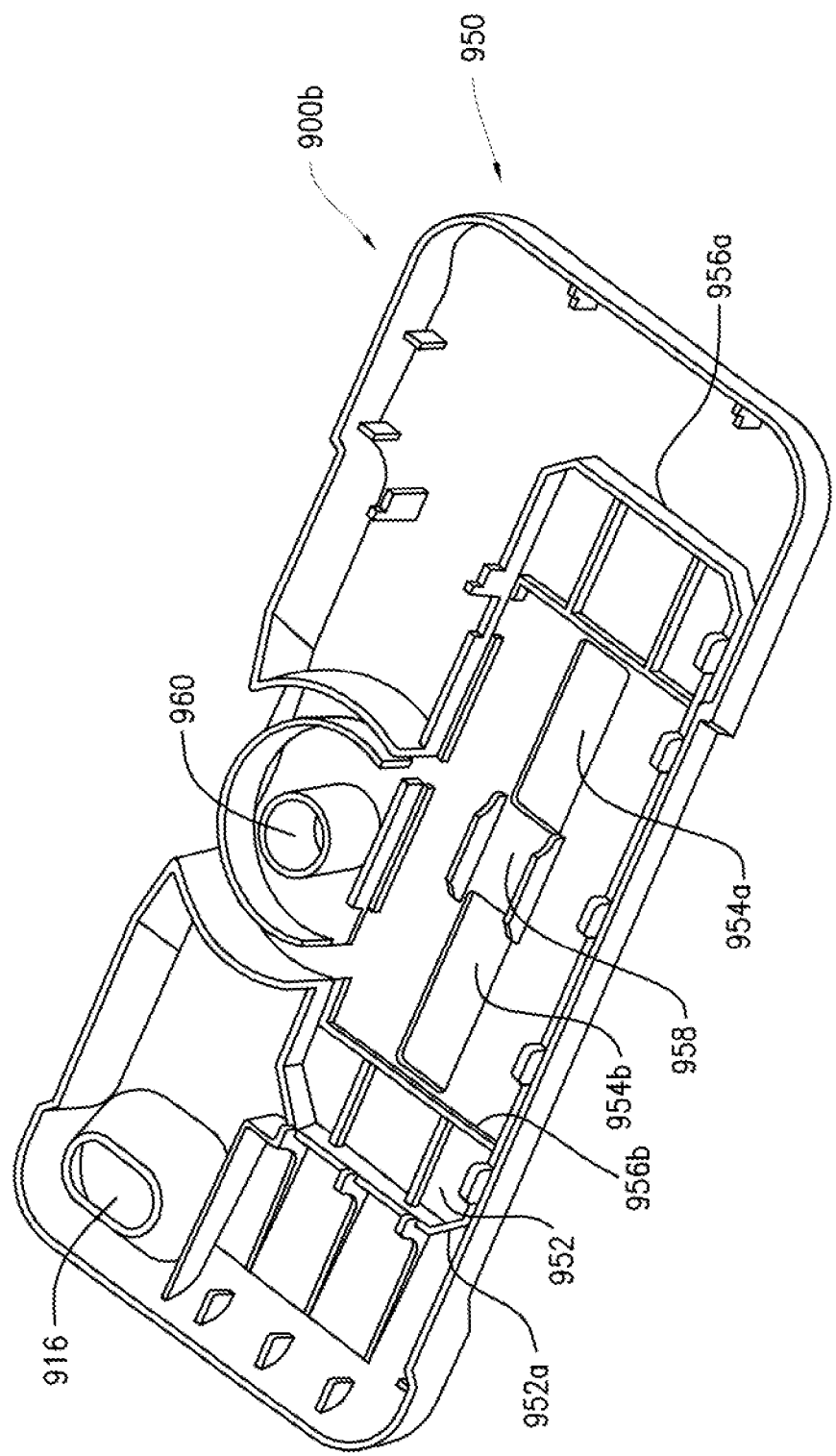
FIG. 30 shows a bottom housing part for the embodiment of FIG. 29.

FIG. 29 shows the charger 900 perspectively, including its provision of a space 902, which is defined by a right wall 904 with curved corner portions 904*a* and 904*b*, by an opposed left wall 906, also with curved corner portions 906*a*, 906*b* (FIG. 32), and by a base wall 903. The space 902 accommodates a telephone (not shown) which has a charging port that will be directly plugged into a charging plug 908 (tailored for a particular phone body) embedded in the body of the charger 900. The port 910 accepts an ordinary telephone charger plug to directly charge the internal telephone battery (e.g. 32 in FIG. 4A) through the port 910.

Figure 31:
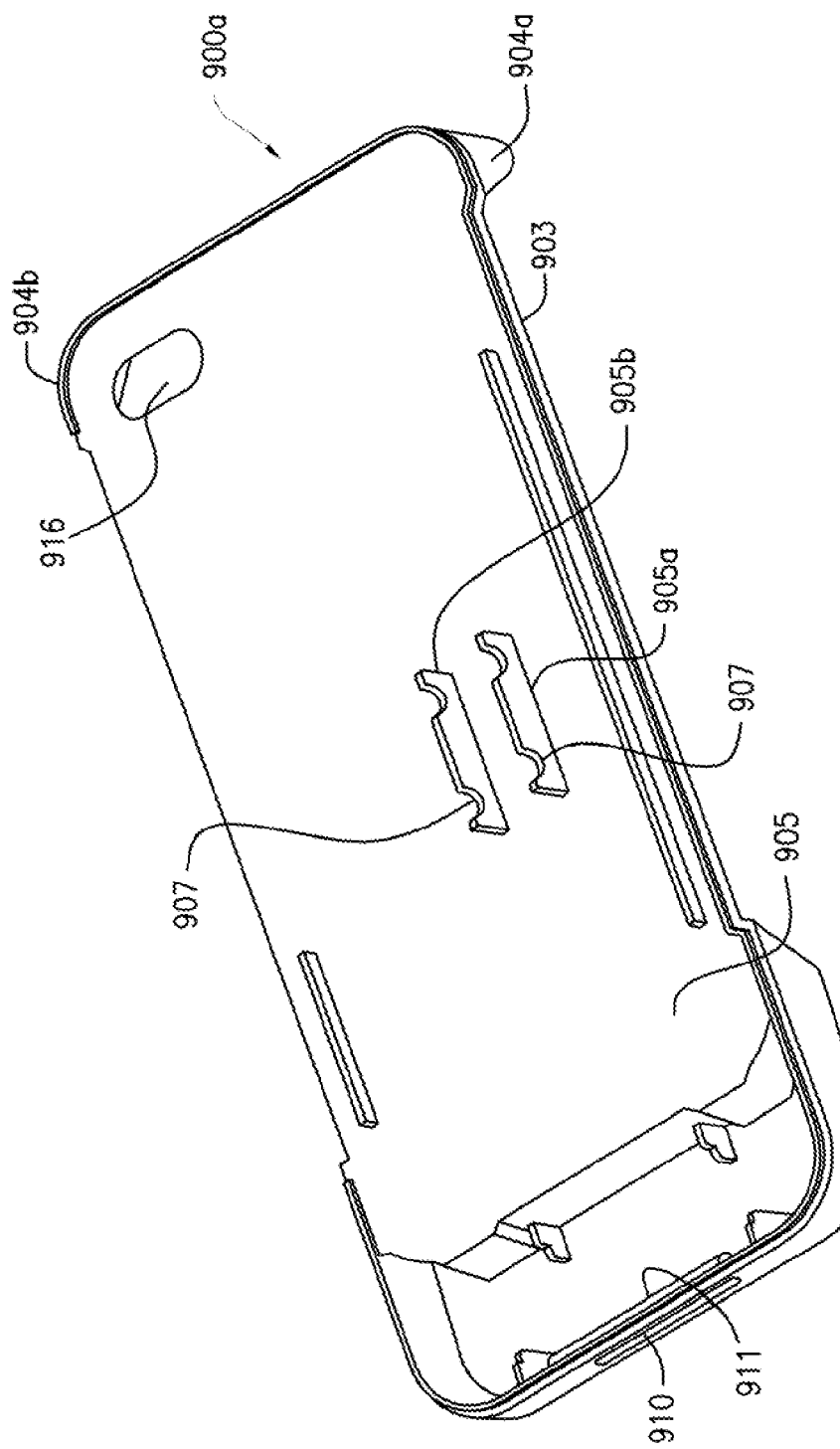
FIG. 31 shows a top housing part for the embodiment of FIG. 9, from the bottom direction thereof.

The charger 900 may also have a through-going opening 916 through which a rear light, or microphone, a camera eye, or any other component which is normally on the back side of the phone, can be viewed from the bottom of the charger 900. The body of the charger 900 has two main housing points, including an upper housing half 900*a* and a bottom housing portion 900*b*, shown separately in FIGS. 31 and 30, respectively. In FIG. 31, the upper half housing 900*a* is shown from the interior side thereof, revealing a space 911 for the connector 908, a main wall 903, which has defined thereon stands 905*a*, 905*b* which hold, support and center the axes on which the AC prongs (to be described) can rotate, in several arcuate axes openings 907. The interior surface 905 of the main wall 903 faces into the interior space of the charger.

Figure 32A:
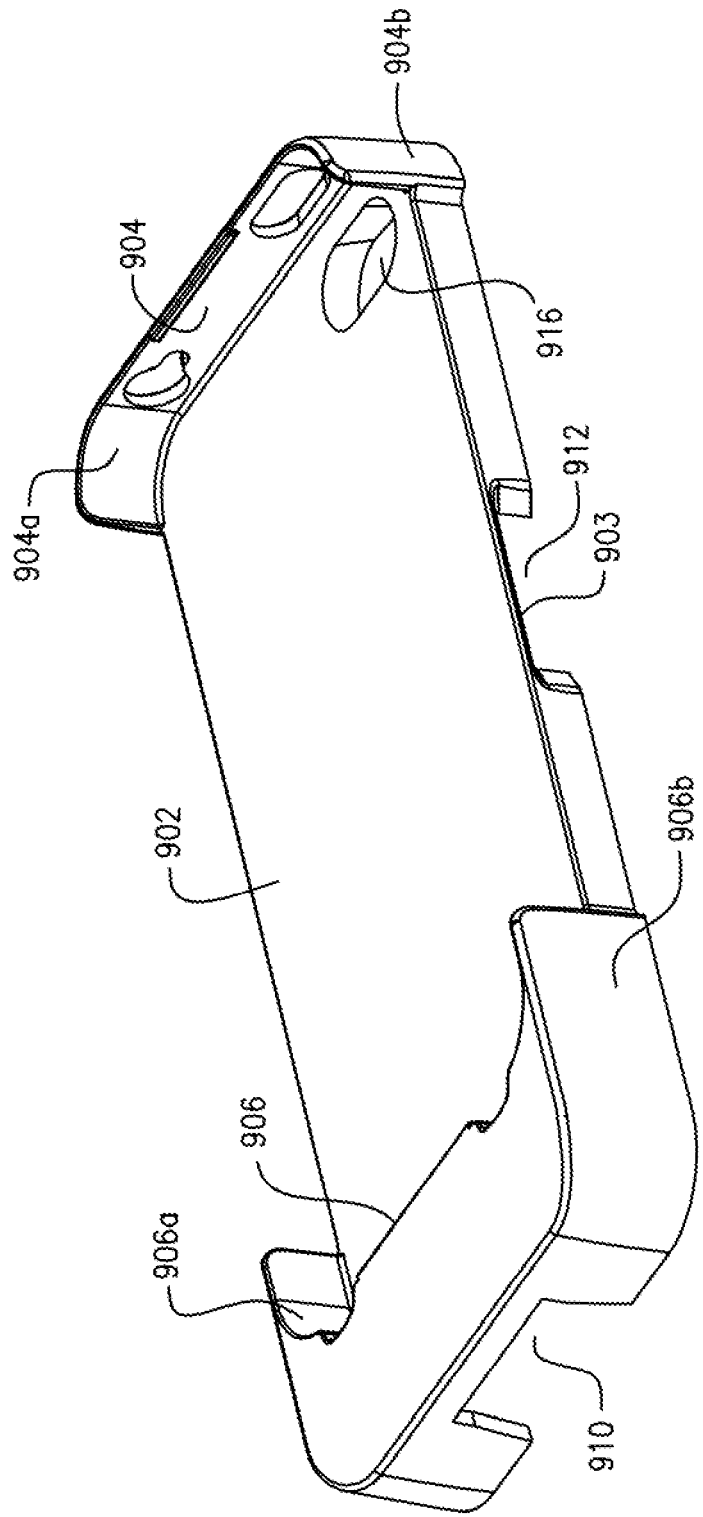
FIG. 32 is an exploded view of various components, including the housing parts in FIGS. 30 and 31 of the embodiment of FIG. 29.
Figure 32B:
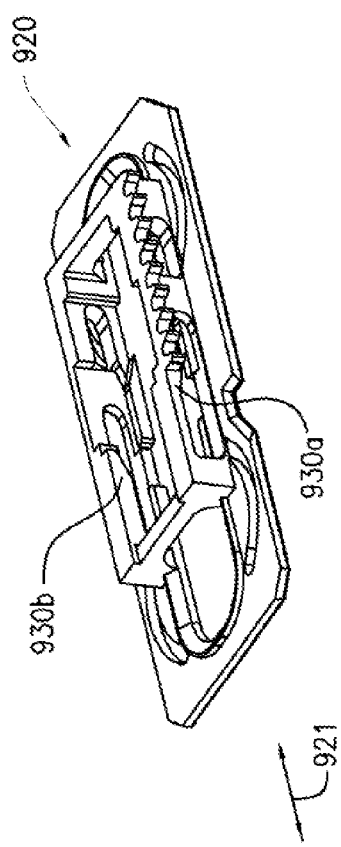
Figure 32C:
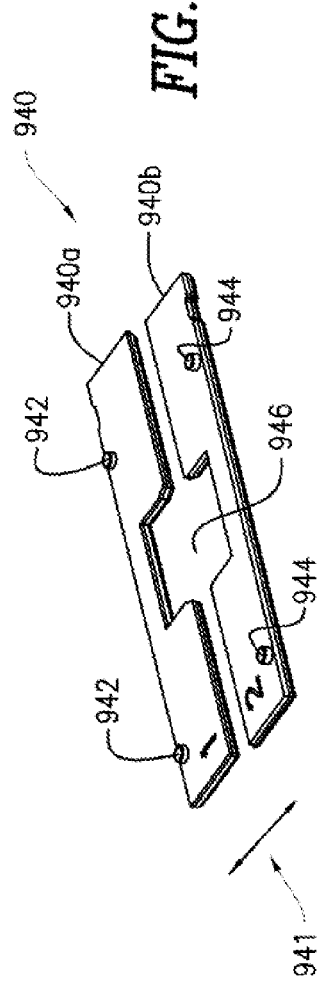
Figure 33B:
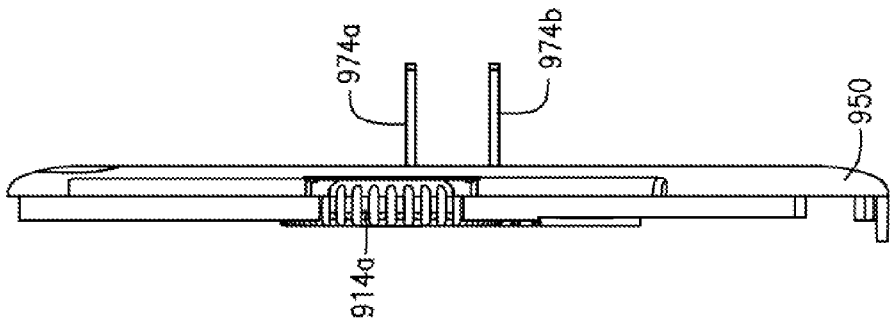
FIG. 33 shows the operation of the embodiment of FIG. 29.
Figure 33A:
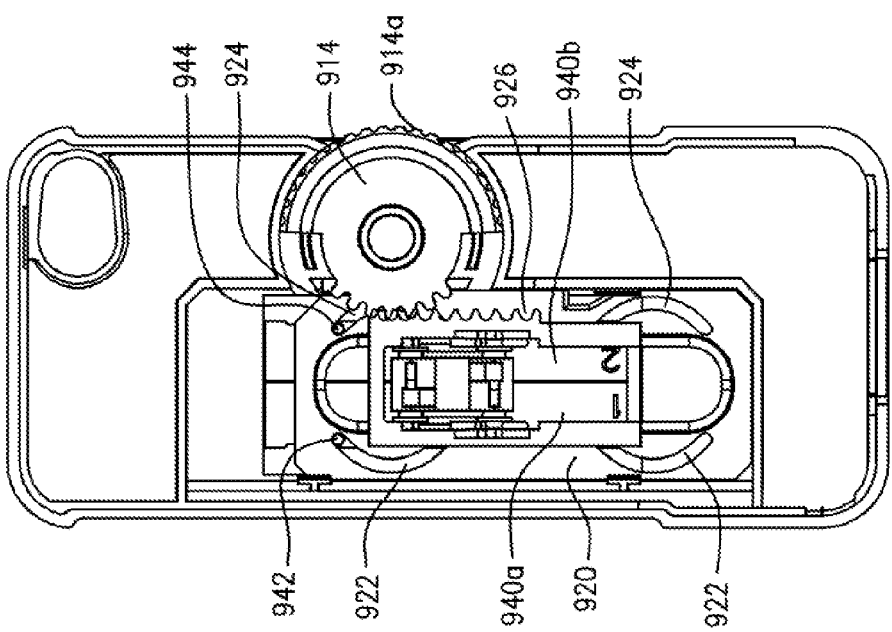
Figure 33D:
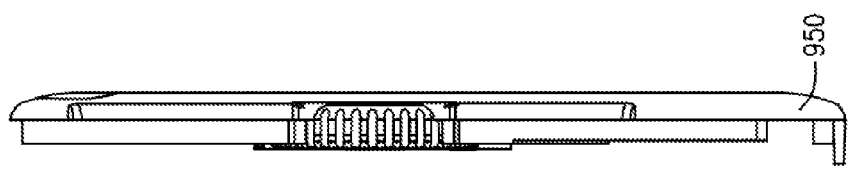
Figure 33C:
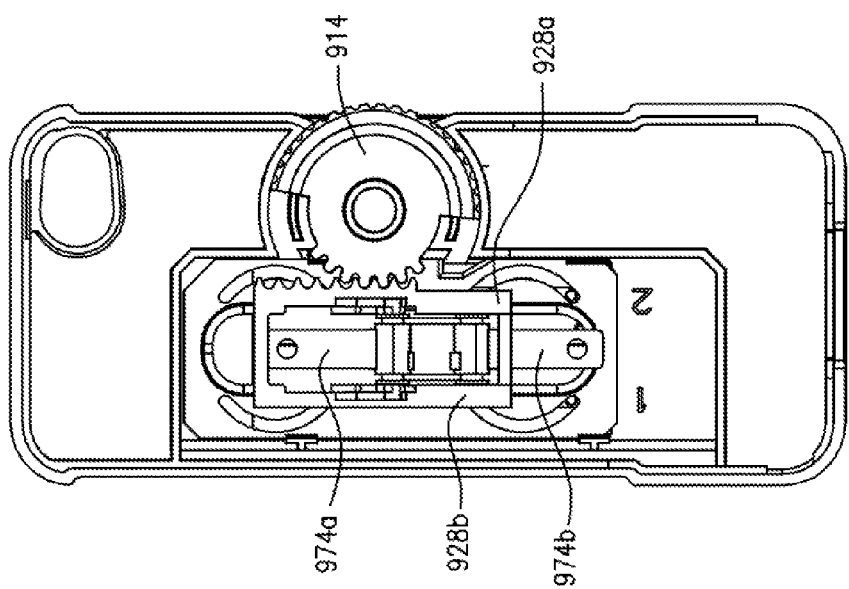
Figure 34:
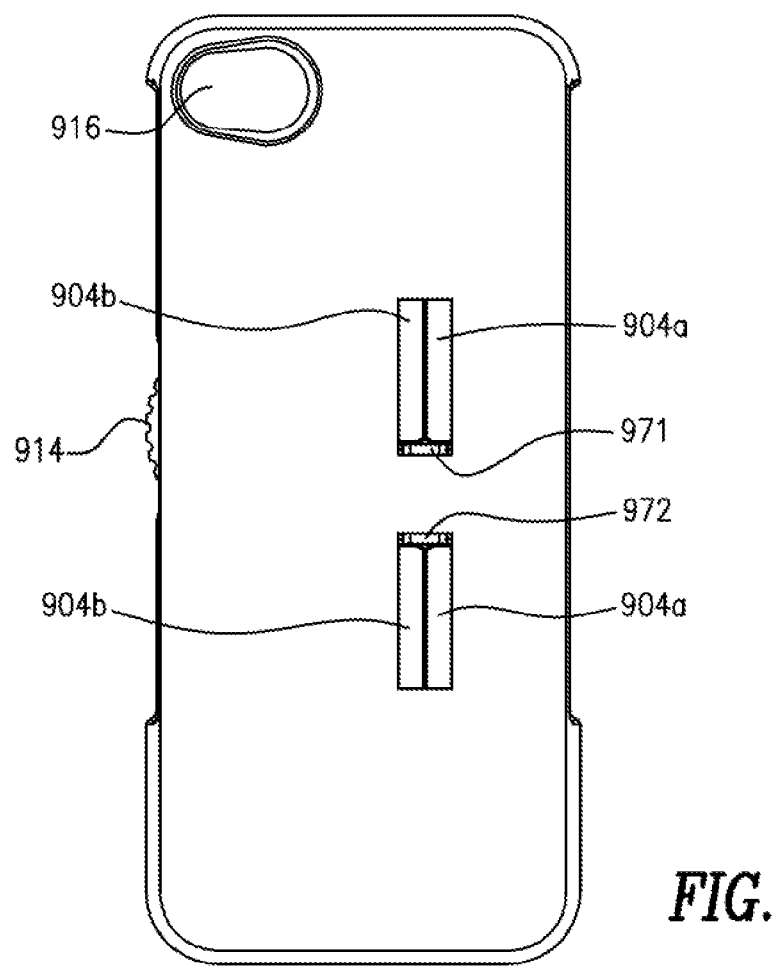
FIG. 34 further illustrates the operation of the embodiment of FIG. 29.

The bottom housing portion 900*b* is a molded piece 950 which defines a plurality of structures that interact and/or support a prong operating mechanism and cover the various components of which are shown in the exploded view of FIG. 32. These components include a sliding actuating body 920, which moves within the interior of the charger to and fro, in the direction of arrows 921; a pair of covering plates 940 which move in opposite directions and perpendicularly to the movement directions of the slider 920; a knob 914 which is shown hovering over the bottom housing component 900*b*; and a prong assembly comprising a pair of prongs 970 and their respective pivots axes 980.

Figure 35:
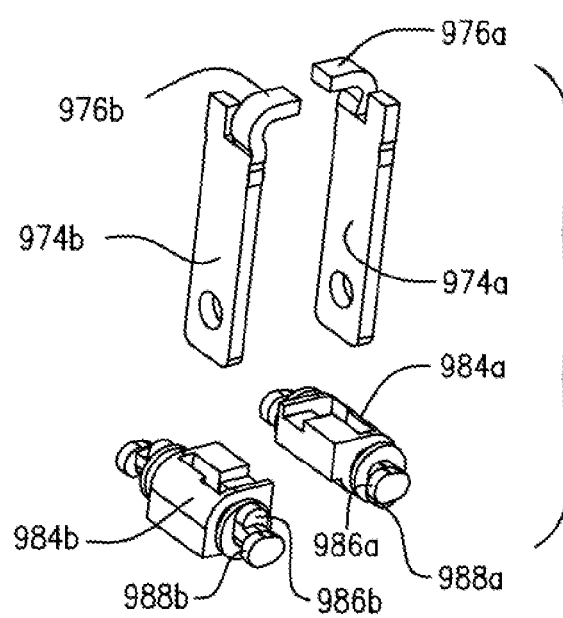
FIG. 35 shows in larger scale, the components (e) and (f) of FIG. 32.

With reference to FIG. 35, the metallic prong 974*a* is pressed through an opening into the pivoting (plastic) element 984*a* which has axis projections 986*a* on both sides. Similarly, the other prong 974*b* is pushed through the opening of the pivot element 984*b* that has its axis projection 986*b* on opposed sides. The assembled prongs are located on opposite sides of the centering structure 958 (FIG. 30), over the respective opening 954*a* and 954*b*, in a manner whereby the metallic prong bodies 974*a*, 974*b* can pivot in and out of the charger via the openings 954*a* and 954*b*. The prong pivots 986*a* and 986*b* are held in place by the upper housing part 900*a*, with the prong axes resting at the four arcuate cutouts 907 (FIG. 31). The sliding cover plates 940*a* and 940*b* (FIG. 32) are installed, spread apart above and below the prongs with the opening 946 therebetween (FIG. 32(*c*)), accommodating the centering structure 958. Thereafter, the sliding actuator 920 is lowered and placed on top of the covering plates, so that its four arcuate channels 922 and 924 (FIG. 33), receive therein the respective, upwardly projecting pins 942 and 944 of the sliding plates 940*a*, 940*b*.

When so assembled, and with the covering plates 940*a*, 940*b* within the space of the bottom housing 900*b* between the slightly upraised edges 956*a* and 956*b*, sliding the actuator 920 right and left will cause the plates to move toward or away from each other, as indicated by the arrow 941. More specifically, at either extreme position of the actuator 920, the plates 940*a*, 940*b* will abut. The plates 940*a*, 940*b* are fully spread apart when their pins 942, 944 are the centers of the arcuate channels 922, 924.

In FIG. 33(*a*), the slider 920 is slid all the way down. The plate pins (942, 944) are at one extreme position in the channels (922,924). The plates (940*a*, 940*b*) are closed, with the prongs (974*a*, 974*b*) jutting out (FIG. 33*b*). In FIG. 33(*c*), the slider is in the opposite position, the plates are again together, but they conceal entirely the opening 954*a*, 954*b* (FIG. 30) with the prongs entirely covered. See FIG. 33*d*.

The rotary knob 914 has ridges 914*a*, which project out of the housing to allow turning of the knob by finger or thumb, in one or the other direction. At the diametrically opposed location, the knob 914 has gears 914*b* which engage serrations 926 (FIG. 33), whereby the turning of the knob 914 moves the sliding actuator 920 back and forth, between the two extreme positions shown in FIGS. 33*a* and 33*c*. The actuating slider 920 comprises spaced, upright walls 928*a*, 928*b* (FIG. 33(*c*)), with interiorly shaped cams 930*a*, 930*b* (FIG. 32(*b*)), which engage the prong detents 988*a* and 988*b* (FIG. 35) and thereby turn the pivoting elements 984*a* and 984*b* in a manner that causes the prongs 974*a* and 974*b* to pivot in and out. The camming surfaces are carefully engineered so that, as knob 914 is turned, the sliding plates initially move sufficiently wide apart before the prongs begin to pivot out of the housing, and vice versa. Once the prongs have rotated 90° out of the housing, continued motion of the knob in the same direction reverses the plate motion to immediately close them on the prongs, leaving only a tight space 971, 972 (FIG. 34), which closely accommodates the wall thickness of the prongs. Thereby the outwardly jutting prongs (974*a*, 974*b*) are firmly supported by being held tightly in the space 971, 972 which is defined by the centering element 958 (FIG. 30) and the covering plates 940*a*, 940*b*. When the knob/actuator move in the opposite direction, as they reach their center regions, the plates 940*a*, 940*b* are fully open, and the prongs pivot inward, into their stowed positions.

It is noted that the prongs 974*a*, 974*b*, when pivoting in and out of the charger housing rotate in opposite directions. That is, while one prong rotates clockwise, the other rotates counterclockwise, whereby the aforementioned camming surfaces are shaped differently for the two prongs within the sliding actuator 920.

As noted above, after the charger has completed charging the telephone, one rotates the knob 914 to the opposite direction, spacing the cover plates apart, allowing the prongs to pivot inside the housing, and continuing the turning results in the cover plates coming towards each other again. In other words, in either extreme position of the knob, the cover plates are abutting one another and close the access to the interior. In general, although a pair of plates are described, the structure can be realized with a single plate.

In FIG. 35, the prongs have arcuate metal portions 976a, 976b to which electrical wires are soldered, in order to supply the AC power to the charging circuit. The charging circuit itself, (and the optional spare battery 32a) which have been previously described are located between the housing portions 900a, 900b, to the left and/or to the right and away from location of the knob 914 and the space 952, in which the sliding actuator slides back and forth between its end walls which are defined at the various beveled corners 952a.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electrical charger for a mobile device, the charger comprising:
    a main body that is jacket-shaped and includes a back panel having a thickness of less than 12 mm, a left panel, a right panel and a bottom panel defining therebetween a space for receiving and holding the mobile device therein, said back panel housing a charging circuit configured to receive a line AC voltage and convert it to a DC voltage suitable for charging the mobile device;
    a pair of AC prongs including a first AC prong and a second prong, selectively foldable into the back panel into a stowed position and into an extended position, at which the AC prongs jutt out of the back panel;
    a connection structure comprising at least said left panel and said right panel and configured to grasp onto and hold the charger secured directly to the mobile device in a detachable manner; and
    the AC prongs are so foldable into the back panel that in their stowed position, the main body plane of each of the prongs is aligned with a main body plane of the back panel,
    wherein the operating element is structurally formed as a slidable cover which exposes the AC prongs in a first sliding position and covers the AC prongs in a second sliding position of the operating element, the slidable cover including a first slidable cover for the first prong and a second and physically separate slidable cover for the second prong.

2. The charger of claim 1, including a movable cover plate which covers an opening of the main body through which the AC prongs are raised from within the body, when the AC prongs are in their stowed position, the cover plate being configured to render the prongs invisible in their stowed position.

3. The charger of claim 2, wherein the cover plate is slidable.

4. The charger of claim 2, wherein the slideable cover comprises a plurality of ridges that can be engaged by users thumb or fingers to slide the cover between the first sliding position and the second sliding position.

5. The charger of claim 2, wherein the slideable cover comprises a pair of jutting projections that initially engage the AC prongs to commence the pivoting thereof into their stowed position.

6. The charger of claim 1, wherein the back panel is a generally flat body with a substantially uniform thickness dimension and with length and width dimensions, so formed that the ratio of the thickness dimension to the product of the length and width dimensions is less than or equal to .05.

7. The charger of claim 1, wherein the left panel and the right panel have cutouts in positions that avoid obstructing access to operating switches, buttons or indicators of the mobile device.

8. The charger of claim 1, wherein the AC prongs are positioned and configured to fold in opposite directions.

9. The charger circuit of claim 1, wherein the AC prongs are formed with a detent mechanism that maintains the operable position of the prongs.

10. The electric charger for a mobile device, the charger comprising:
    a main body housing a charging circuit configured to receive a line AC voltage and convert it to a DC voltage suitable for charging a battery of the mobile device;
    a pair of AC prongs selectively foldable into the main body into a stowed position and into an extended position, at which the AC prongs jutt out of the main body;
    a connection structure configured to grasp onto and hold the charger secured directly to the mobile device in a detachable manner; and
    a cover structured and configured to conceal the AC prongs to render them invisible in the stowed position, including an operating element actuatable by a user of the charger and configured to raise the AC prongs from the stowed position and to return the AC prongs to the stowed position, in a manner wherein the pivotable movement of the AC prongs in and out of the main body is substantially proportional to the movement of the operating element, wherein each prong has a respective pivot body, and a tight wire is wound on by each said pivot body and said operating element pushes and pulls on said tight wire to move said prongs from and to said stowed position.

11. The charger of claim 10, wherein the main body is comprised of a back panel that is a generally flat body with a substantially uniform thickness dimension and with length and width dimensions, so formed that the ratio of the thickness dimension to the product of the length and width dimensions is less than or equal to .05.

* * * * *